(12) United States Patent
Michael

(10) Patent No.: US 11,683,402 B2
(45) Date of Patent: Jun. 20, 2023

(54) TRANSMISSION APPARATUS, TRANSMISSION METHOD, RECEPTION APPARATUS, AND RECEPTION METHOD

(71) Applicant: SATURN LICENSING LLC, New York, NY (US)

(72) Inventor: Lachlan Michael, Saitama (JP)

(73) Assignee: Saturn Licensing LLC, New York, NY (US)

(*) Notice: Subject to any disclaimer, the term of this patent is extended or adjusted under 35 U.S.C. 154(b) by 202 days.

(21) Appl. No.: 17/214,776

(22) Filed: Mar. 26, 2021

(65) Prior Publication Data

US 2021/0218833 A1 Jul. 15, 2021

Related U.S. Application Data

(63) Continuation of application No. 16/664,492, filed on Oct. 25, 2019, now Pat. No. 10,992,789, which is a
(Continued)

(30) Foreign Application Priority Data

Jul. 5, 2013 (JP) .............................. JP2013-141740

(51) Int. Cl.
*H04L 69/22* (2022.01)
*H04N 21/2381* (2011.01)
(Continued)

(52) U.S. Cl.
CPC ............ *H04L 69/22* (2013.01); *H04L 5/0044* (2013.01); *H04L 65/70* (2022.05); *H04L 69/04* (2013.01);
(Continued)

(58) Field of Classification Search
CPC . H04L 1/0072; H04L 5/0044; H04L 49/9094; H04L 49/9057; H04L 65/607;
(Continued)

(56) References Cited

U.S. PATENT DOCUMENTS 8,381,301 B1 2/2013 Wilson et al.
2004/0004560 A1 1/2004 Okamoto
(Continued)

FOREIGN PATENT DOCUMENTS

CA 2819221 5/2012
CN 1625151 A 6/2005
(Continued)

OTHER PUBLICATIONS

EBU-UER DVB Digital Video Broadcasting, Final draft ETSI EN 302 755 V.1.3.1; ETSI European Standard; Digital Video Broadcasting (DVB); Frame structure channel coding and modulation for a second generation digital terrestrial television broadcasting system (DVB-T2); (Nov. 2011), 189 pages.
(Continued)

*Primary Examiner* — Michael Thier
*Assistant Examiner* — Prince A Mensah
(74) *Attorney, Agent, or Firm* — Jeffery J Brosemer

(57) ABSTRACT

The present disclosure relates to a transmission apparatus, a transmission method, a reception apparatus, and a reception method which make it possible to control redundancy of a header in packet communication. A region representing a packet length in a header of a packet is set according to a size of a payload of an input packet. A header of a baseband packet includes a minimum fixed length header including type identification information for identification of a type of the input packet or the stream and information of a packet length of the input packet or the stream stored in a payload of the baseband flame packet.

6 Claims, 19 Drawing Sheets

Related U.S. Application Data continuation of application No. 16/133,737, filed on Sep. 18, 2018, now Pat. No. 10,516,769, which is a continuation of application No. 14/422,440, filed as application No. PCT/JP2014/066567 on Jun. 23, 2014, now Pat. No. 10,225,379.

(51) Int. Cl.

| | | |
|---|---|---|
| *H04L 69/04* | (2022.01) | |
| *H04N 21/236* | (2011.01) | |
| *H04L 65/70* | (2022.01) | |
| *H04L 5/00* | (2006.01) | |

(52) U.S. Cl.
CPC ....... *H04N 21/236* (2013.01); *H04N 21/2381* (2013.01)

(58) Field of Classification Search
CPC ......... H04L 65/70; H04L 69/04; H04L 69/22; H04N 21/236–2381
See application file for complete search history.

(56) References Cited

U.S. PATENT DOCUMENTS

| | | | |
|---|---|---|---|
| 2004/0034819 A1 | 2/2004 | Haydock | |
| 2005/0233710 A1 | 10/2005 | Lakkis et al. | |
| 2008/0037540 A1 | 2/2008 | Ngo | |
| 2008/0123692 A1 | 5/2008 | Jung | |
| 2008/0313678 A1 | 12/2008 | Ryu et al. | |
| 2009/0201948 A1 | 8/2009 | Patwardhan et al. | |
| 2010/0031124 A1 | 2/2010 | Shinagawa | |
| 2011/0051745 A1 | 3/2011 | Lee et al. | |
| 2011/0099063 A1 | 4/2011 | Clemmons | |
| 2011/0099453 A1 | 4/2011 | Shinya et al. | |
| 2011/0274211 A1 | 11/2011 | Ko | |
| 2012/0042092 A1* | 2/2012 | Hong | H04N 21/47202 709/231 |
| 2012/0170596 A1 | 7/2012 | Hwang et al. | |
| 2013/0028155 A1 | 1/2013 | Zang et al. | |
| 2013/0279380 A1 | 10/2013 | Hong | |
| 2013/0291046 A1 | 10/2013 | Ko | |
| 2014/0029502 A1* | 1/2014 | Hong | H04N 21/2362 370/312 |
| 2014/0064280 A1* | 3/2014 | Qin | H04B 7/18582 370/392 |
| 2015/0003472 A1 | 1/2015 | Hwang | |

FOREIGN PATENT DOCUMENTS

| | | |
|---|---|---|
| CN | 101401346 A | 4/2009 |
| CN | 101971594 A | 2/2011 |
| CN | 102255906 A | 11/2011 |
| CN | 102835150 A | 12/2012 |
| CN | 102860023 A | 1/2013 |
| JP | 2011-97245 | 5/2011 |
| WO | WO 02/25444 A1 | 3/2002 |
| WO | WO 2011/105803 A2 | 9/2011 |
| WO | WO 2012/070859 A2 | 5/2012 |

OTHER PUBLICATIONS

Extended European Search Report dated Feb. 17, 2016 in Patent Application No. 14820672.5.

"Digital Video Broadcasting (DVB); Next Generation broadcasting system to Handheld, physical layer specification (DVB-NGH)" DVB Document A160, XP055248828, Nov. 2012, 295 pages.

"Draft IEEE Standard for Local and Metropolitan Area Networks: Media Independent Handover Services" IEEE P802.21/D01.00, XP002459799, Mar. 2006, 177 Pages.

Mexican Office Action dated Mar. 27, 2017, issued in Mexican Patent Application No. MX/a/2015002528 (English translation).

International Search Report dated Aug. 12, 2014 in PCT/JP2014/066567.

Combined Office Action and Search Report dated May 25, 2018 in Chinese Patent Application No. 201480002208.5 (with English language translation) citing documents AO-AR therein, 25 pages.

\* cited by examiner

TRANSMISSION APPARATUS, TRANSMISSION METHOD, RECEPTION APPARATUS, AND RECEPTION METHOD

RELATED CASE APPLICATIONS

This application is a continuation application of U.S. application Ser. No. 16/664,492, filed Oct. 25, 2019, which is a continuation application of U.S. application Ser. No. 16/133,737, filed Sep. 18, 2018, now U.S. Pat. No. 10,516,769, issued Dec. 24, 2019, which is a continuation application of U.S. application Ser. No. 14/422,440, filed Feb. 19, 2015, now U.S. Pat. No. 10,225,379, issued Mar. 5, 2019, which is a National Stage of PCT/JP2014/066567, filed Jun. 23, 2014, which claims priority benefit of Japanese Application No. 2013-141740, filed Jul. 5, 2013. The entire contents of the above-noted applications are incorporated herein by reference.

TECHNICAL FIELD

The present technique relates to a transmission apparatus, a transmission method, a reception apparatus, and a reception method. More specifically, the present technique relates to a transmission apparatus, a transmission method, a reception apparatus, and a reception method in which the number of bits to store information of a packet length in a header is set variably according to a length of a transmission packet. Thus, redundancy of a header is controlled and an input packet can be transmitted/received efficiently at high speed.

BACKGROUND ART

Along with digitalization of a broadcast signal and development of communication technique, it is becoming possible to transmit content including visual image, sound, and the like both in broadcasting and communication.

In the broadcasting, content can be transmitted simultaneously to a great number of users in a stable manner. However, only unidirectional communication is possible. On the other hand, in the communication, bidirectional transmission of content can be performed according to a request. However, since congestion of a network is generated, it is not possible to transmit the content in a stable manner.

Thus, technique to make it possible to transmit various kinds of content and to perform bidirectional communication also in the broadcasting by using an IP packet used widely in the communication has been proposed. As one of these kinds of technique, for example, there is digital video broadcasting-terrestrial second generation (DVB-T2) (see, for example, Non-Patent Document 1).

Also, other than what has been described, a different broadcast method in which an IP packet can be transmitted has been proposed. For example, there are also advanced broadcasting satellite (BS) digital broadcasting, integrated services digital broadcasting-terrestrial sound broadcasting (ISDB-TSB), digital video broadcasting-satellite second generation (DVB-S2), advanced television system committee-digital television (ATSC-DTV), and the like.

CITATION LIST

Non-Patent Document

Non-Patent Document 1: ETSI EN 302 755 V1.3.1 (2012-04)

SUMMARY OF THE INVENTION

Problems to be Solved by the Invention

In the above-described broadcast method in which an IP packet can also be transmitted such as the advanced digital BS broadcasting, the ISDB-T, the DVB-T2, the DVB-S2, and the ATSC-DTV, a type length value (TLV) packet, a transport stream (TS) packet, a generic stream encapsulation (GSE) packet (for both of DVB-T2 and DVB-S2), and a TS packet are respectively used as forms during multiplexing. Here, in respect to the ISDB-TSS and the ATSC-DTV each of which uses a TS packet, when an IP packet is transmitted, the IP packet is encapsulated in a TS packet by a method such as unidirectional lightweight encapsulation (ULE) or ATSC-multi-protocol encapsulation (MPE) and is transmitted. Also, in a method other than the above two methods, an IP packet is transmitted without using a TS packet.

When a packet of content for broadcasting and an IP packet are mixed and transmitted, packets having various packet lengths are distributed. That is, a packet length of an IP packet which includes control information and the like and which is considered as the minimum is 40 bytes (B) in a transmission control protocol/Internet protocol (TCP/IP) and is 28 bytes (B) in a user datagram protocol/Internet protocol (UDP/IP). Also, a TS packet is fixed, for example, to 188 bytes. Moreover, as a medium packet length, there is an IP packet of around 576 bytes. On the other hand, the maximum transmission unit (MTU) of the IP packet is 1500 bytes.

As described, there are various packet lengths of an IP packet. However, in statistics of an actually-used packet length in the broadcast method in which an IP packet can be also transmitted, it is confirmed that packets of the minimum size and the maximum size are used most frequently and a packet of a medium size is not used relatively.

Thus, in a broadcast method including an IP packet, in a case where the number of bits is set in such a manner that information of the maximum packet length is stored in a header, when an IP packet having a several bytes is transmitted, there are a great number of packets in each of which upper bits are not used among bits set for a packet length in the header.

That is, when the number of bits in which information corresponding to the maximum packet length can be stored is prepared for the header although there are actually a certain amount of distribution of packets having short packet lengths, upper bits are not used in a packet which is used in a relatively frequent manner and which has a short packet length. As a result, in a distributed packet, a header may become redundant.

The present technique has been provided in view of the forgoing and is, specifically, to reduce redundancy of a header of a packet and to improve communication efficiency by setting the number of bits to store information of a packet length in a header of a packet according to the packet length and by realizing utilization corresponding to the packet length.

Solutions to Problems

A transmission apparatus which is a first aspect of the present technique includes: a baseband packet generation unit configured to generate a baseband packet from an input packet or a stream; a baseband frame generation unit configured to generate a baseband frame from the baseband packet; and a transmission unit configured to transmit the baseband frame, wherein a header of the baseband packet includes a minimum fixed length header including type identification information for identification of a type of the input packet or the stream and information of a packet length of the input packet or the stream stored in a payload of the baseband packet.

When the type identification information indicates that the type of the input packet or the stream is an IP packet, the minimum fixed length header can include, in addition to the type identification information, minimum fixed length identification information for identification whether the input packet length is a minimum fixed length, and minimum input packet length information as information of the input packet length.

When the minimum fixed length identification information indicates that the input packet length is not the minimum fixed length, the header can include a variable length header in addition to the minimum fixed length header, and when the minimum input packet length information is set with lower bits of the input packet length as the minimum input packet length, the variable length header can include variable packet length information including upper bits thereof, a division flag to indicate whether the input packet or the stream is divided and a baseband packet is configured, and an additional header flag indicating whether there is an additional header to be added to the variable length header.

When the division flag indicates that the input packet or the stream is divided and the baseband packet is configured, the variable length header can further include a division frag. header, and the division frag. header can include a frag. ID for identification of the input packet or the stream, and a frag. counter to be information for identification of the divided baseband packet.

When the additional header flag indicates that there is the additional header, the header can include the additional header in addition to the minimum fixed length header and the variable length header, and the additional header can include additional header identification information for identification of a type of the additional header, extension packet length information including bits higher than that of the variable packet length information representing the input packet length, and additional information header flag indicating whether there is an additional information header.

When the additional information header flag indicates that there is the additional information header, the header can include the additional information header, which includes predetermined information, in addition to the minimum fixed length header, the variable length header, and the additional header.

When the additional header identification information indicates label information, the header can include the additional information header, which includes predetermined label information, in addition to the minimum fixed length header, the variable length header, and the additional header.

The baseband packet generation unit can identify the type of the input packet or the stream, register the identified type into a type identification part, and generate a baseband packet corresponding to the identified type.

The minimum input packet length information can be set as information having a minimum fixed length and including bit information in which the number of bits corresponding to a minimum packet size is offset.

When the type identification information is a transport stream packet, the minimum fixed length header can include, in addition to the type identification information, null packet deletion information for identification whether a null packet in the transport stream packet is deleted and a baseband packet is configured, and information of the number of transport stream packets, which information indicates the number of transport stream packets, as information of the input packet length included in the baseband packet.

When the packet deletion information is information indicating that the null packet in the transport stream packet is deleted and the baseband packet is configured, the header can further include information indicating the number of deleted null packets.

The type identification information can include unspecified protocol information indicating a protocol other than that of information for specification of a protocol of the input packet or the stream, and when the type identification information is the unspecified protocol information, the header can include, in addition to the minimum fixed length header, predetermined protocol information for specification of a predetermined protocol.

A transmission method which is the first aspect of the present technique includes: generating a baseband packet from an input packet or a stream; generating a baseband frame from the baseband packet; and transmitting the baseband frame, wherein a header of the baseband packet includes a minimum fixed length header including type identification information for identification of a type of the input packet or the stream and information of a packet length of the input packet or the stream stored in a payload of the baseband packet.

A reception apparatus which is a second aspect of the present technique includes: a reception unit configured to receive a transmitted signal including a baseband frame; a baseband packet generation unit configured to generate a baseband packet from the received baseband frame; and an input packet generation unit configured to generate an input packet or a stream from the baseband packet, wherein a header of the baseband packet includes a minimum fixed length header including type identification information for identification of a type of the input packet or the stream and information of a packet length of the input packet or the stream stored in a payload of the baseband packet.

A reception method which is the second aspect of the present technique includes: receiving a transmitted signal including a baseband frame; generating a baseband packet from the received baseband frame; and generating an input packet or a stream from the baseband packet, wherein a header of the baseband packet includes a minimum fixed length header including type identification information for identification of a type of the input packet or the stream and information of a packet length of the input packet or the stream stored in a payload of the baseband packet.

In the first aspect of the present technique, a baseband packet is generated from an input packet or a stream, a baseband frame is generated from the baseband packet, and the baseband frame is transmitted. In a header of the baseband packet, a minimum fixed length header including type identification information for identification of a type of the input packet or the stream and information of a packet length of the input packet or the stream stored in a payload of the baseband packet is included.

In the second aspect of the present technique, a transmitted signal including a baseband frame is received, a baseband packet is generated from the received baseband frame, and an input packet or a stream is generated from the baseband packet. In a header of the baseband packet, a minimum fixed length header including type identification information for identification of a type of the input packet or the stream and information of a packet length of the input packet or the stream stored in a payload of the baseband packet is included.

Effects of the Invention

According to the first and second aspects of the present technique, it becomes possible to realize transmission/reception of various types of input packets or streams by a single stream. Also, even when input packets or streams of various sizes are received, it becomes possible to control redundancy of a header of a packet and to perform transmission/reception efficiently.

MODE FOR CARRYING OUT THE INVENTION

[Configuration Example of Transmission Apparatus]

Figure 1:
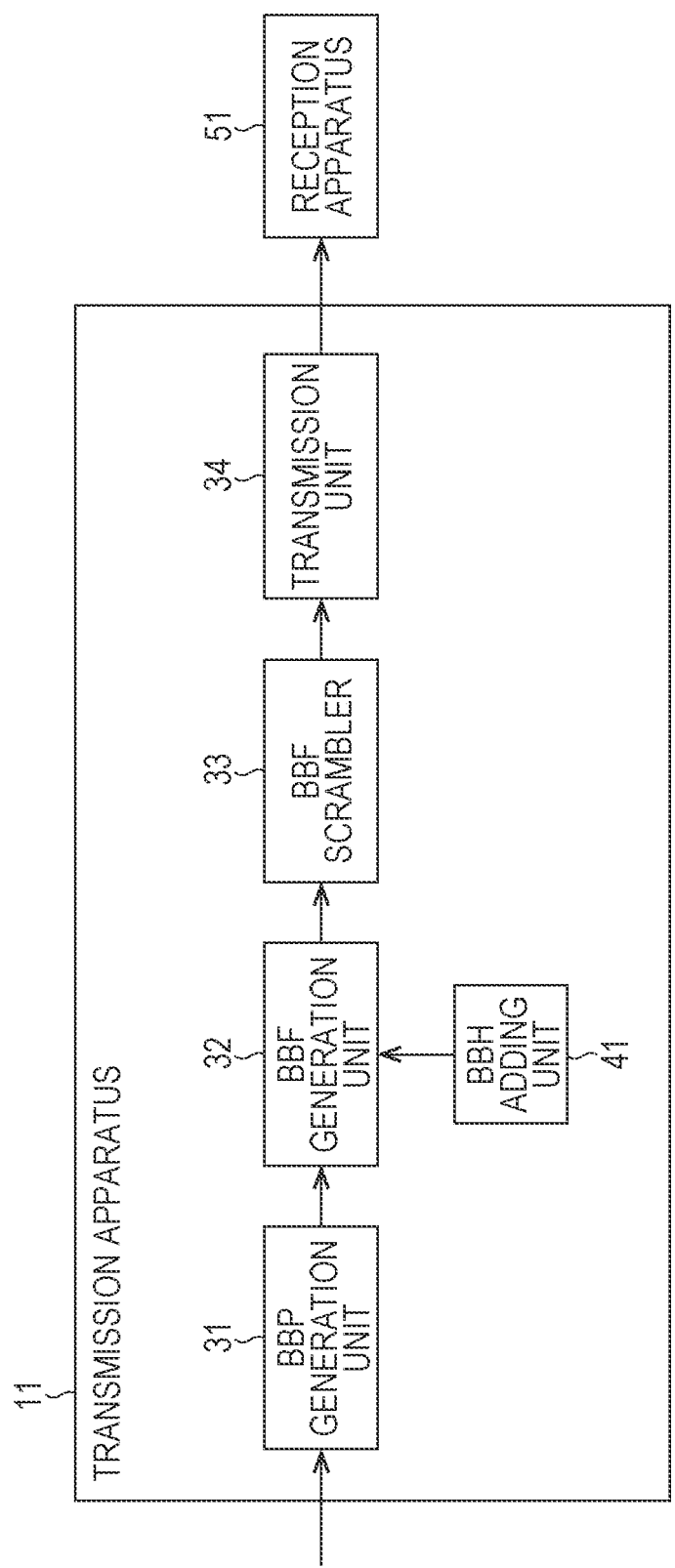
FIG. 1 is a view for describing a configuration example of a transmission apparatus to which the present technique is applied.

FIG. 1 is a view illustrating a configuration example of an embodiment of a transmission apparatus to which the present technique is applied. For example, the transmission apparatus 11 transmits, to a reception apparatus which will be described with reference to FIG. 2, various input packets, which are broadcast signals, such as a transport stream (TS) packet, an IP packet, and a different packet such as a continuous bit stream packet. In this case, by combining a plurality of input packets, the transmission apparatus 11 generates a baseband packet (BBP). Here, the transmission apparatus 11 prepares a plurality of kinds of the number of bits as the number of bits necessary for representation of a packet length in a header of the BBP and configures a BBP header by performing switching according to a packet size of the BBP. Thus, redundancy of the BBP header is controlled.

More specifically, the transmission apparatus 11 includes a BBP generation unit 31, a baseband frame (BBF) generation unit 32, a BBF scrambler 33, and a transmission unit 34. Moreover, the BBF generation unit 32 includes a BBF header (BBH) adding unit 41.

The BBP generation unit 31 identifies a type of an input packet and generates a BBP by combining a plurality of input packets according to the identified type. Then, the BBP generation unit 31 supplies the generated BBP to the BBF generation unit 32. Here, the BBP generation unit 31 can switch between a plurality of kinds of the number of bits for representation of a packet length of the BBP in the header of the BBP when performing setting. The BBP generation unit 31 switches the number of bits according to the packet length of the input packet. As a result, it becomes possible to control redundancy of the header due to variation of the packet length of the BBP. Note that a detail of the BBP generated by the BBP generation unit 31 will be described later with reference to FIG. 3 and the drawings thereafter.

The BBF generation unit 32 combines necessary BBPs and generates a BBF having a predetermined frame length. Then, the BBF generation unit 32 supplies the generated BBF to the BBF scrambler 33. Here, the BBF generation unit 32 controls the BBH adding unit 41 to generate and add a BBH which is a header of the BBF.

The BBF scrambler 33 scrambles the BBF generated by the BBF generation unit 32 and supplies the scrambled BBF to the transmission unit 34.

The transmission unit 34 transmits the scrambled BBF to the reception apparatus through a network or a broadcasting network.

[Configuration Example of Reception Apparatus]

Figure 2:
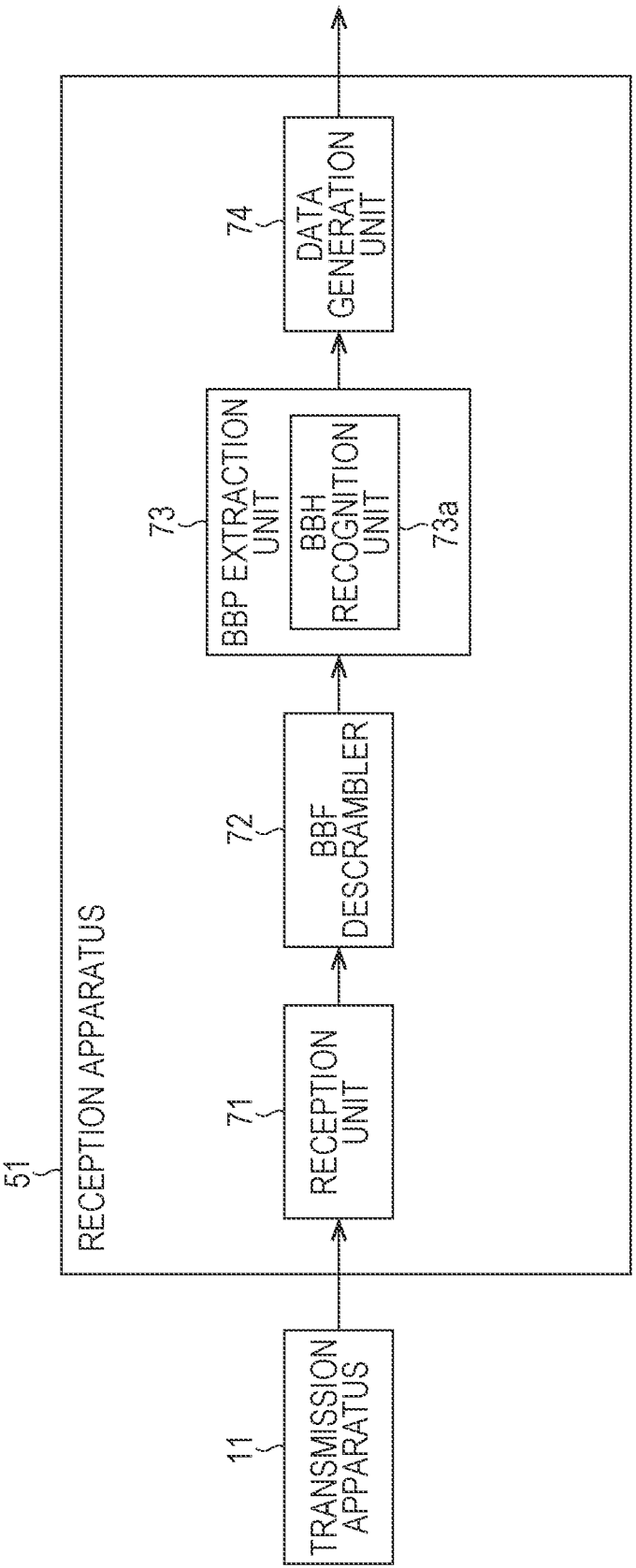
FIG. 2 is a view for describing a configuration example of a reception apparatus to which the present technique is applied.

FIG. 2 is a view illustrating a configuration example of the reception apparatus configured to receive a BBF transmitted from the transmission apparatus 11 described with reference to FIG. 1, to generate a BBP from the BBF, to generate an input packet from the BBP, and to transmit the generated input packet.

More specifically, the reception apparatus 51 in FIG. 2 includes a reception unit 71, a BBF descrambler 72, a BBP extraction unit 73, and an input packet generation unit 74. The reception unit 71 receives a BBF transmitted from the transmission apparatus 11 through a network, a broadcasting network, or the like and supplies the received BBF to the BBF descrambler 72.

The BBF descrambler 72 descrambles the scrambled BBF supplied by the reception unit 71, makes the BBF descrambled, and supplies the BBF to the BBP extraction unit 73.

The BBP extraction unit 73 includes a BBH recognition unit 73a. The BBP extraction unit 73 controls the BBH recognition unit 73a to recognize information of the BBH which is a header of the BBF. Based on the recognized information of the BBH, the BBP extraction unit 73 extracts a BBP from the BBF and supplies the extracted BBP to the input packet generation unit 74.

The input packet generation unit 74 restores and generates, from the BBP supplied by the BBP extraction unit 73, the input packet input into the transmission apparatus 11 which is a transmission source. Then, the input packet generation unit 74 outputs the input packet.

[Configuration of BBP]

Next, a BBP generated by the BBP generation unit 31 of the transmission apparatus 11 based on the input packet will be described with reference to FIG. 3.

The BBP includes a data field which configures a header and a BBP payload. In FIG. 3, by combining configurations excluding a data field DF which configures a payload in the bottom stage in the drawing and a part of the number of deleted TS packets DNPC which will be described later, a header is formed. According to a packet length of the BBP, three kinds of the number of bits to store the packet length can be switched and used for the header of the BBP.

Figure 3:
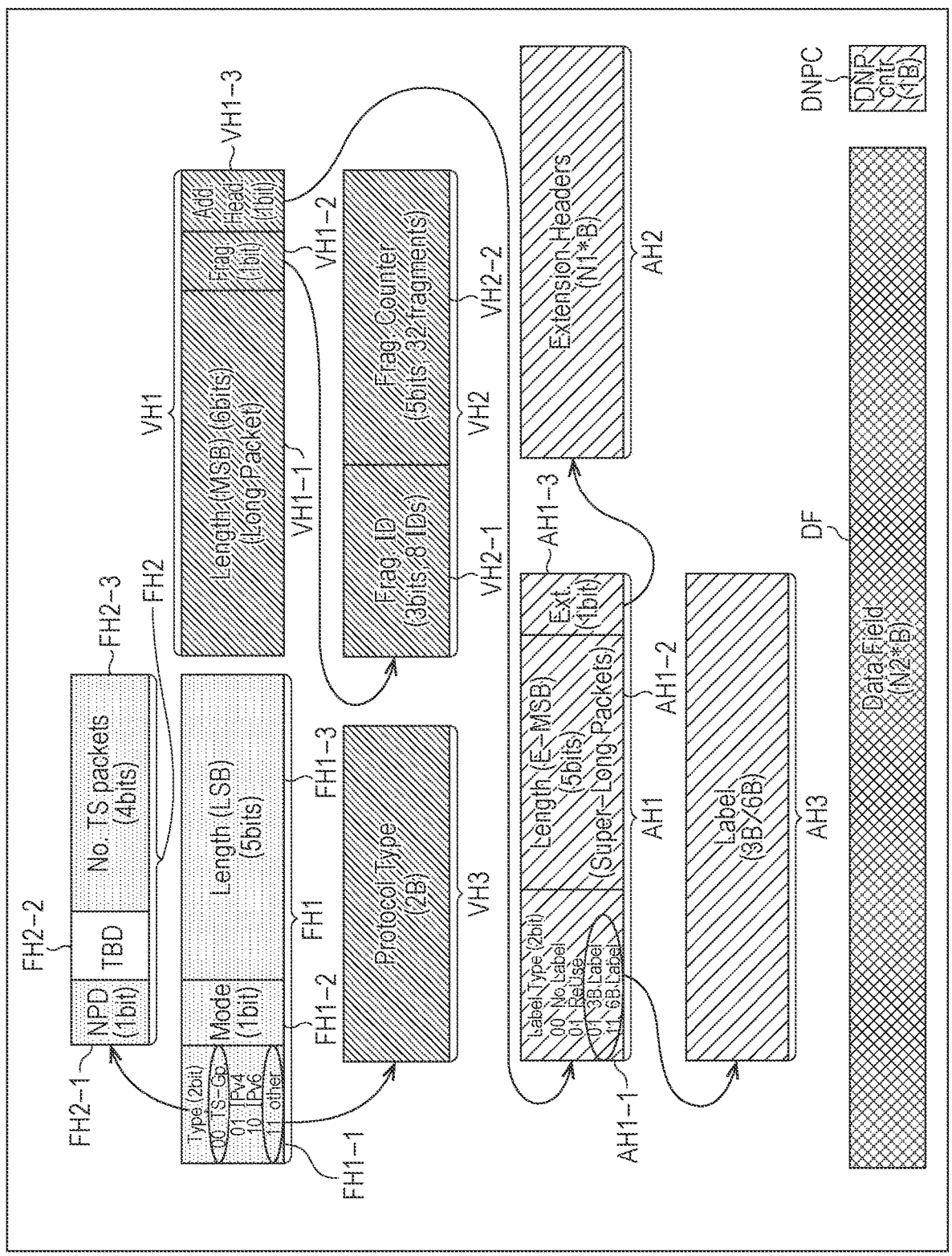
FIG. 3 is a view for describing a configuration example of a header of a BBP.

A header of when the input packet is in the minimum fixed length is a minimum fixed length header FH1 illustrated in a second stage from the top in a left part in FIG. 3. The minimum fixed length header FH1 has one byte (eight bit). Also, the minimum fixed length header FH1 includes a type identification part (Type) FH1-1 having two bits, a mode identification part (Mode) FH1-2 having one bit, and a packet length part (Length (LSB)) FH1-3 having five bits.

The type identification part FH1-1 indicates a type of an input packet. More specifically, as illustrated in FIG. 3, the type identification part FH1-1 identifies a type of four kinds of input packets in two bits. In an example illustrated in FIG. 3, when the type identification part FH1-1 is 00, 01, 10, and 11, it is respectively indicated that a type of the input packet is a group of a transport stream (TS) packet (TS-Gp), an Internet protocol version 4 (IPv4), an Internet protocol version 6 (IPv6), and the other.

The remaining six bits of the minimum fixed length header FH1 varies according to a type identified in the type identification part FH1-1. That is, when the type identification part FH1-1 is either of 01, 10, and 11, that is, when a type specified by the type identification part FH1-1 is the IPv4, the IPv6, or the other, a configuration becomes what is illustrated in the second stage from the top in the left part in FIG. 3. That is, the configuration includes, from the left, one bit of the mode identification part FH1-2 indicating whether a mode is the short packet (SP) mode and five bits of the packet length part FH1-3 indicating a packet length of the IP packet.

The short packet mode is a mode of a header of a BBP in which the header only includes the minimum fixed length header FH1. Here, when the mode identification part FH1-2 stores 1, it is indicated that a header is the short packet mode. Also, when the mode identification part FH1-2 stores 0, it is indicated that a header is not the short packet mode. For example, when the mode identification part FH1-2 stores 1, a header is the short packet mode. Thus, the header only includes the minimum fixed length header FH1. When a data field DF which configures a BBP payload is added to the minimum fixed length header FH1, a BBP is configured.

Thus, in this case, a packet length of the data field DF to be the payload is represented by five bits at a maximum. However, an actual packet length is the number of bits larger than five. This is because the minimum value of the packet length is offset and the packet length is represented by five bits.

On the other hand, when the mode identification part FH1-2 stores 0, that is, when a header is not the short packet (SP) mode and includes not only the minimum fixed length header FH1, a variable length header VH1 illustrated in an upper right part in FIG. 3 is added to the minimum fixed length header FH1 and a header is configured.

The variable length header VH1 has one byte (eight bit). More specifically, the variable length header VH1 includes a packet length part (Length (MSB)) VH1-1 having six bits, a frag. part (Frag.) VH1-2 having one bit, and an additional header identification part (Add Head) VH1-3 having one bit.

The packet length part VH1-1 stores upper six bits representing a packet length of the BBP. On the other hand, here, the packet length part FH1-3, which has five bits, of the minimum fixed length header FH1 stores lower five bits. Thus, in this case, a packet length of the BBP is stored as information having 11 bits in total.

The frag. part VH1-2, functioning for example as a flag, stores information indicating whether there is a division mode in which an input packet is divided and a BBP is configured. More specifically, when a mode is not the division mode in which an input packet is divided and a BBP is configured, the frag. part VH1-2 stores 0 and in a case of the division mode, the frag. part VH1-2 stores 1. Moreover, when 1 is stored in the frag. part VH1-2 and it is indicated that a mode is the division mode, a frag. header VH2 illustrated in a second stage from the top in a right part in FIG. 3 is added in addition to the variable length header VH1.

The frag. header VH2 has one byte (eight bit) and includes a frag. ID part (Frag. ID) VH2-1, which has 3 bits and which stores an IP packet to be a division source, and a frag. counter part (Frag. Counter) VH2-2 which has five bits and which stores a division number for identification of an individual divided payload.

The additional header identification part VH1-3, functioning for example as a flag, stores information indicating whether there is an additional header AH1 or a protocol type header VH3. When there is no additional header AH1 or protocol type header VH3, the additional header identification part VH1-3 stores 0 and when there is an additional header AH1 or protocol type header VH3, the additional header identification part VH1-3 stores 1. Moreover, when the additional header identification part VH1-3 stores 1, for example, the additional header AH1 illustrated in a third stage from the bottom in the left part in FIG. 3 or the protocol type header VH3 illustrated in a third stage from the top in a left part is added.

The additional header AH1 has one byte (eight bit) and includes a label type part (Label Type) AH1-1 having two bits, a packet length part (Length (E-MSB)) AH1-2 having five bits, and an extension header identification part (Ext.) AH1-3 having one bit.

The label type part (Label Type) AH1-1 stores information for identification of a type of a label added and stored as a header. The packet length part AH1-2 stores information of the most significant five bits indicating a packet length of the BBP.

Thus, in this case, in respect to the packet length of the BBP, the least significant five bits are stored in the packet length part FH1-3 of the minimum fixed length header FH1, six bits higher than the least significant five bits are stored in the packet length part VH1-1 of the variable length header VH1, and the most significant five bits are stored in the packet length part AH1-2 of the additional header AH1. As a result, in the header of the BBP, information of the packet length is stored as information having 16 bits.

That is, in representation of the packet length, it is possible to set a configuration of a header by switching between a first mode including the packet length part FH1-3, which has five bits, of the minimum fixed length header FH1, a second mode in which six bits of the packet length part VH1-1 of the variable length header VH1 is added and which has 11 bits, and a third mode in which five bits of the packet length part AH1-2 of the additional header AH1 is further added and which has 16 bits.

As a result, in respect to a header of a BBP, it becomes possible to adjust the number of bits, which is set in the packet length part, in three stages according to a packet length of the BBP. Thus, it is possible to increase/decrease the number of bits of the packet length part when necessary. As a result, it becomes possible to control redundancy of the BBP and to improve communication speed. Note that in the following, the first mode is also referred to as a short packet mode, the second mode is also referred to as a variable length mode, and the third mode is also referred to as an additional variable length mode. Moreover, here, an example in which three bit lengths which are five bits, 11 bits, and 16 bits are provided previously to store packet lengths will be described. However, as a bit to store a packet length, a greater kinds of the number of bits may be set and redundancy may be further reduced by increasing choices.

Also, as illustrated in FIG. 3, the label type part AH1-1 stores, in two bits, information for identification of types of four kinds of labels added to the header. More specifically, in the example in FIG. 3, when the label type part AH1-1 stores 00, 01, 10, and 11, it is respectively indicated that a type of an added label is No. Label (label is not added), ReUse (previous label is reused), 3BLabel (label having length of three byte), and 6BLabel (label having length of six byte). Note that here, a label is, for example, a media access control address (mac address) or the like for identification of a device. Moreover, when the label type part AH1-1 stores 10 or 11, that is, when a label having a length of three bytes or a label having a length of six bytes is added, as illustrated in the second stage from the bottom in the left part in FIG. 3, a label header (Label) AH3 having three bytes or six bytes is added to the following stage of the additional header AH1.

The extension header identification part AH1-3, functioning for example as a flag, stores information indicating whether there is an extension header AH2. More specifically, the extension header identification part AH1-3 stores 0 when there is no extension header AH2. When there is an extension header AH2, the extension header identification part AH1-3 stores 1 and the extension header AH2 having arbitrary N1 bytes as illustrated in the second stage from the bottom in the right part in FIG. 3 is added to the additional header AH1. The extension header AH2 stores arbitrary header information.

Moreover, in the minimum fixed length header FH1, when the type identification part FH1-1 is 11 and a specified type is the other which is not the IPv4, the IPv6, and the like, two bytes of a protocol type header (Protocol Type) VH3 illustrated in the third stage from the top in the left part in FIG. 3 is added.

Also, when the type identification part FH1-1 is 00 and specified information is a TS packet (TS-Gp), in the minimum fixed length header FH1, six bits other than two bits of the type identification part FH1-1 include a configuration of a TS header FH2 illustrated in an upper left part in FIG. 3.

The TS header FH2 and the type identification part FH1-1 have one byte (eight bit) in total and include a null packet identification part FH2-1 which has one bit and indicates whether a mode is a null packet deletion mode to delete a null packet and a part of the number of TS packets FH2-3 which has 4 bits and indicates the number of TS packets included in a payload of the BBP. Note that one bit is a null bit (TBD) FH2-2. Here, when a BBP is generated, in a case where a mode is not the null packet deletion mode to delete a null packet from a payload, the null packet identification part FH2-1 stores 0 and in a case where a mode is the null packet deletion mode, the null packet identification part FH2-1 stores 1. Also, when a mode is the null packet deletion mode, a part of the number of deleted TS packets DNPC which has one byte and indicates the number of deleted TS packets is further added to the following stage of the data field DF.

Note that in the following, a mode of when an input packet is a TS packet will be referred to as a TS mode. Also, in FIG. 3, the TS header FH2 includes the null packet identification part FH2-1, the part of the number of TS packets FH2-3 which has four bits and indicates the number of TS packets included in a payload of a BBP, and a null bit (TBD) FH2-2. However, in the following, one byte further including two bits of the type identification part FH1-1 will be also referred to as the TS header FH2.

[Configuration Example of BBF Including BBP in Variable Length Mode]

Next, a configuration example of a BBF including a BBP in the variable length mode will be described with reference to FIG. 4.

Figure 4:
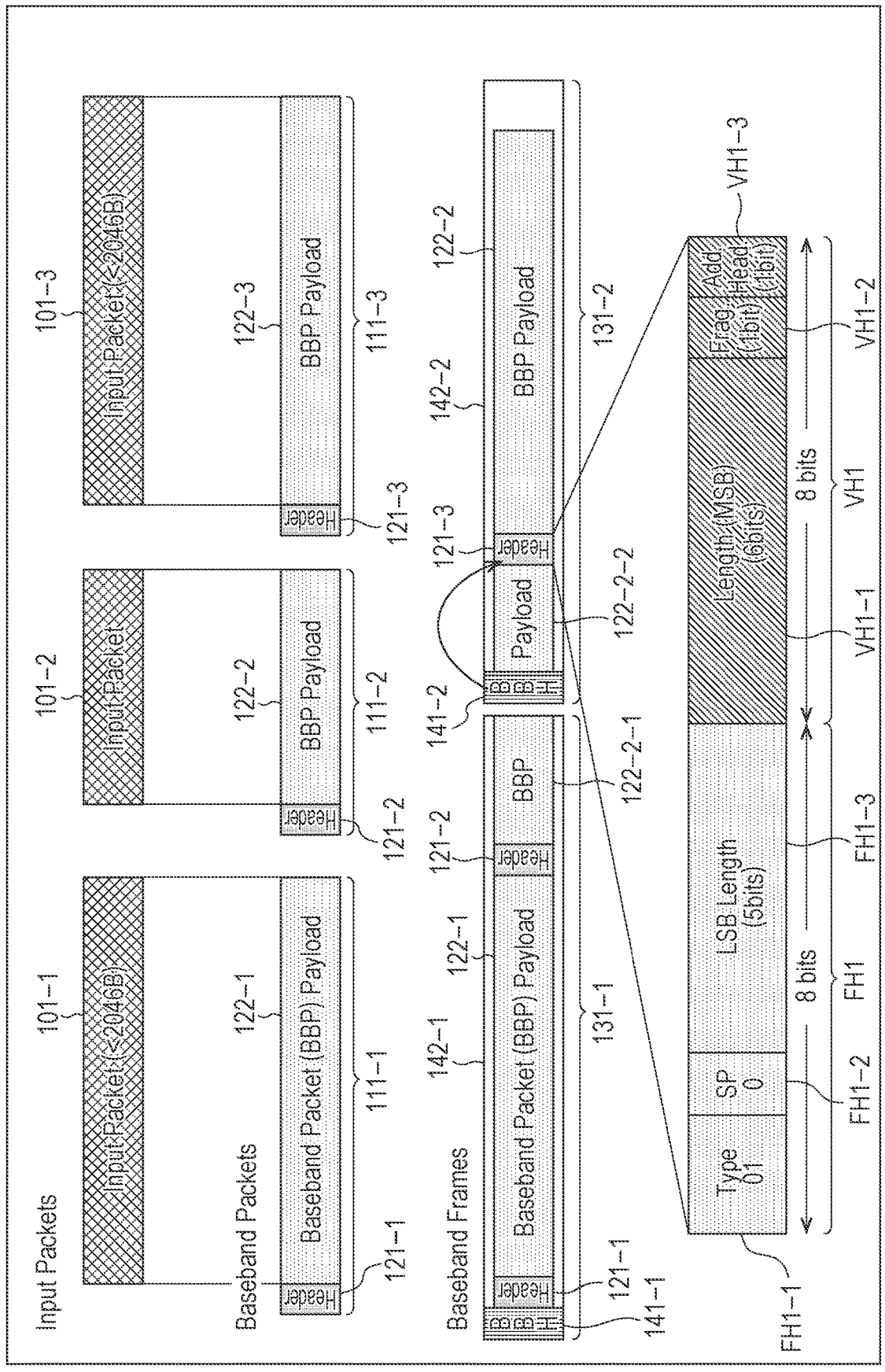
FIG. 4 is a view for describing a configuration example of the BBP and a BBF in a variable length mode.

As illustrated in the top stage in FIG. 4, it is assumed that input packets 101-1 to 101-3 are input. Here, when it is not necessary to distinguish the input packets 101-1 to 101-3 from each other, the input packets 101-1 to 101-3 will be simply referred to as an input packet 101 and the other configurations will be referred to in a similar manner. Also, it is assumed that the input packet 101 is an IPv4-enabled IP packet and has a packet length shorter than 2046 bytes, that is, a packet length which can be represented by 11 bits in a byte unit.

In this case, as illustrated in the second stage from the top in FIG. 4, headers 121-1 to 121-3 are respectively provided to the input packets 101-1 to 101-3 by the BBP generation unit 31, and baseband packets (BBP) 111-1 to 111-3 to which BBP payloads 122-1 to 122-3 are respectively added are generated. Here, the BBP payload 122 is the input packet 101.

Also, the header 121 includes a configuration illustrated in the bottom stage in FIG. 4. Note that in the drawing, contents of a header 121 of a BBP 111 stored in a BBF 131 in the second stage from the bottom in the drawing is illustrated but a configuration thereof is identical to a configuration of a header 121 of a BBP 111 illustrated in the second stage from the top.

That is, since the maximum packet length of the BBP is 2048 bytes, 11 bits are necessary. Accordingly, the header 121 becomes the variable length mode and includes the minimum fixed length header FH1 and the variable length header VH1. More specifically, 01, 0, and information of a packet length of an input packet which information has five bits are respectively stored in the type identification part (Type) FH1-1, a mode identification part (SP) FH-2, and a packet length part (LSB Length) FH-3 of the minimum fixed length header FH1. That is, in the minimum fixed length header FH1 in FIG. 4, it is indicated that the input packet is the IPv4 and that a mode is not the short packet mode. Also, the information of a packet length which information has five bits is stored as lower five bits of the packet length of the BBP.

Also, six bits of a packet length, 0, and 0 are respectively stored in the packet length part VH1-1, the frag. part VH1-2, and the additional header identification part VH1-3 of the variable length header VH1. That is, the variable length header VH1 in FIG. 4 indicates that upper six bits of the packet length of the BBP which is an input packet are stored, that a mode is not the division mode, and that there is no additional header.

Moreover, a packet length of an input packet up to 2048 bits which can be represented by 11 bits by the packet length parts FH1-1 and VH1-1 can be represented.

The BBF generation unit 32 converts a BBP illustrated in the second stage from the top in FIG. 4 into BBFs 131-1 and 131-2 illustrated in a third stage from the top in FIG. 4.

Figure 5:
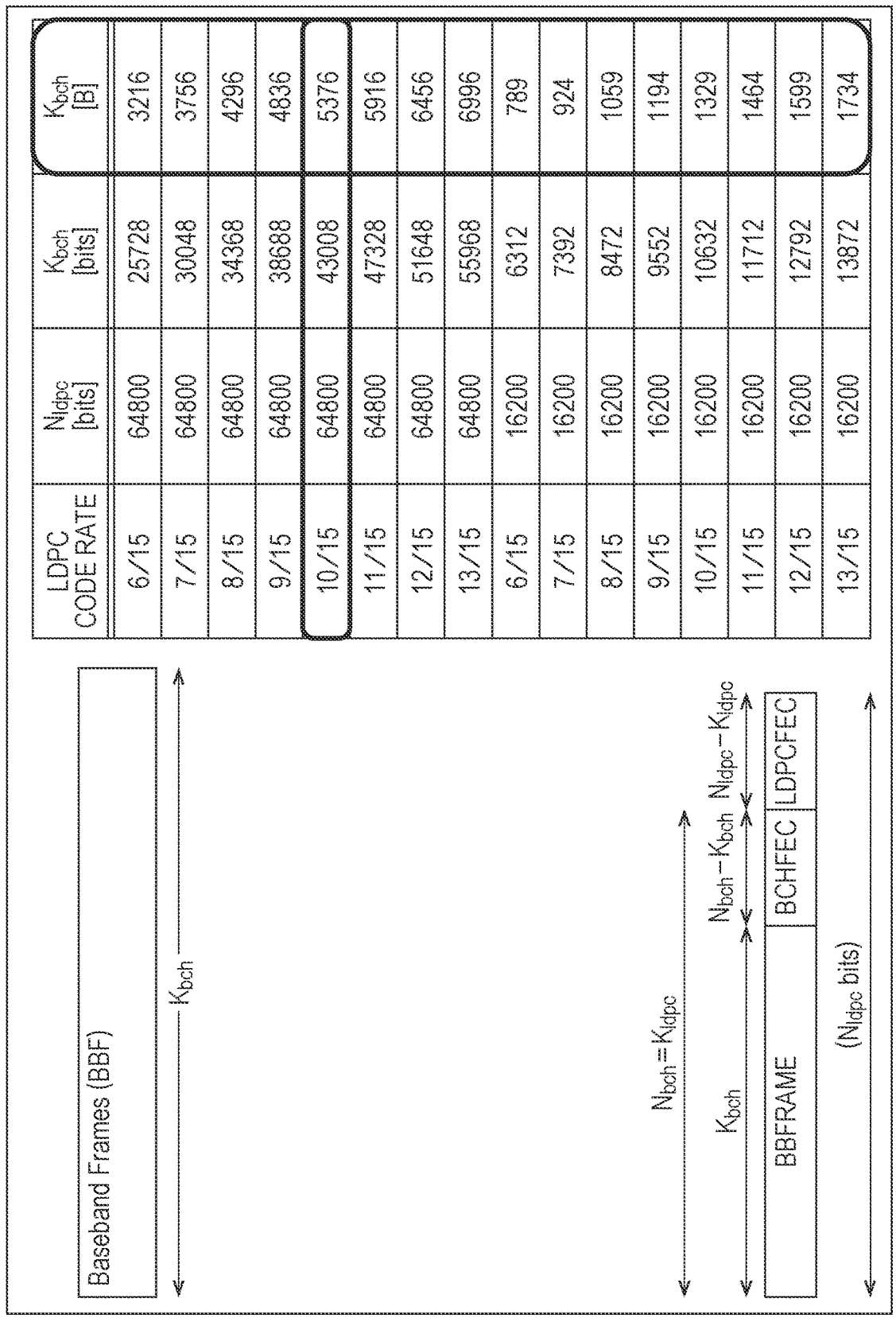
FIG. 5 is a view for describing a frame length of the BBF.

That is, the BBFs 131-1 and 131-2 respectively include headers (BBH) 141-1 and 141-2 and BBF payloads 142-1 and 142-2. Also, a frame length of the BBF 131 is specified by a code length and a code rate. That is, for example, as illustrated in FIG. 5, the frame length of the BBF 131 is set according to a code length and a code rate. The BBF generation unit 32 generates a BBF 131 having a frame length set according to the code length and the code rate.

That is, in FIG. 5, as illustrated in a left part, a frame length of the BBF 131 is indicated by K_bch. Also, in a chart in a right part in FIG. 5, a code rate (LDPC code rate) in performing low density parity-check coding (LDPC) of the BBP, an input code length $N_{ldpc}$ [bits], a code length after coding $K_{bch}$ [bits], and a data length $K_{bch}$ [B] which is a code length after coding which code length is converted in a byte unit are illustrated from the left. In the drawing, the code rate of the LDPC is 6/15 to 13/15 from the top and the code length $K_{ldpc}$ [bits] is 64800 bits and 16200 bits from the top. Here, the code length after coding is set as a frame length of the BBF 131.

Here, a relationship between the input code length $N_{ldpc}$ and the code length after coding $K_{bch}$ becomes a relationship illustrated in a lower left part in FIG. 5. That is, as illustrated in the lower left part in FIG. 5, the input code length $N_{ldpc}$ includes BBFRAME (=code length $K_{bch}$), BCHFEC (so-called forward error correction code FEC of external code), and LDPCFEC (so-called FEC of internal code). Thus, when the input code length $N_{ldpc}$ is coded according to a code rate, the code length $K_{ldpc}$ including BCHFEC is calculated. Also, the frame length $K_{bch}$ (=BBFRAME) of the BBF 131 illustrated in a right part in FIG. 5 is a value in which BCHFEC is subtracted from the code length after coding $K_{ldpc}$ which code length includes BCHFEC. BCHFEC is specified by the input code length $N_{ldpc}$ and is, for example, 192 bits when the input code length $N_{ldpc}$ is 64800. Also, for example, when the input code length $N_{ldpc}$ is 16200, BCHFEC is 168 bits.

Thus, as illustrated in a horizontally-long part surrounded by a thick line in the drawing, when the input data length $K_{ldpc}$ is 64800 [bits] and the LDPC code rate is 10/15, the data length after coding $K_{bch}$ is 43008 (=64800×10/15-192) [bits] and becomes 5376 [B].

That is, a numeric value in a vertically-long frame surrounded by a thick line in the right column in the right part in FIG. 5 is set as a frame length and in the chart in FIG. 5, the maximum frame length of the BBF is 6996 [B]. Thus, in the header (BBH) 141 of the BBF 131, an address at least having 13 bits becomes necessary.

Also, as described, a frame length of the BBF 131 is specified by a code length and a code rate. Thus, as illustrated in the third stage from the top in FIG. 4, after the header 141 is stored at the head, the BBP 121 is stored into the BBF payload 142 serially for the frame length. As a result, as illustrated in the third stage from the top in FIG. 4, in the BBF 131-1, when the header 141-1 is stored at the start position, the BBP 111-1 is stored at a position following the header 141-1. Then, a BBP 111-2 is stored in the following stage. However, since it is not possible to store the whole BBP 111-2, a header 121-2 and one part 122-2-1 of a BBP payload 122-2 are stored as a part.

Also, in the next BBF 131-2, when the header 141-2 is stored at the start position, the other part 122-2-2 of the BBP payload 122-2 is stored at a position following the header 141-2 and the BBP 111-3 is stored at a position following the position thereof. The header (BBH) 141 has two bytes and stores information of a pointer indicating a head position of the BBP stored in the BBF 131. Thus, by combining the header 121-2 of the BBF 131-1, the BBP payload 122-2-1, and the BBP payload 122-2-2 stored at the position following the header 141-2 of the BBF 131-2, it becomes possible to restore the BBP 111-2. Also, based on the information of the header 141-2, a head position where the header 121-3 of the BBP 111-3 is stored can be checked with a pointer, it becomes possible to read the BBP 111-3 stored at the head appropriately.

[Detail Configuration Example of Header of BBP in Variable Length Mode]

Next, a detail configuration example of a header 121 of a BBP 111 in the variable length mode will be described with reference to FIG. 6. Note that here, it is assumed that an IP packet included in the input packet 101 is an Internet protocol version 4 (IPv4)/user datagram protocol (UDP) and that a packet length thereof is 1500 B. Also, it is assumed that an input packet is not divided and is converted into one BBP and it is further assumed that there is no adding of an additional header or the like.

Figure 6:
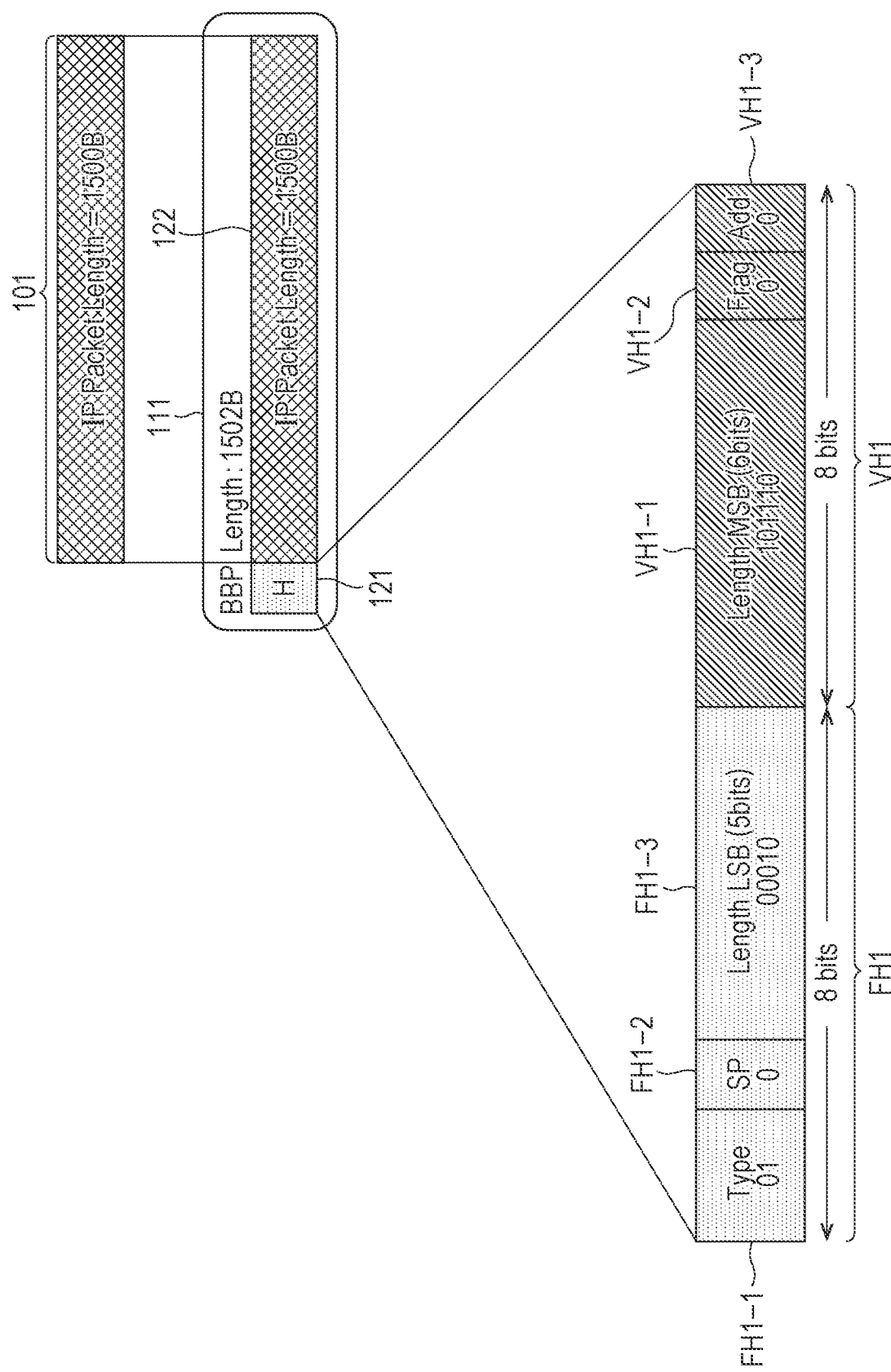
FIG. 6 is a view for describing a detail configuration example of the header of the BBP.

That is, as illustrated in the top stage in FIG. 6, since the input packet 101 has 1500 B, at least six bits are necessary for a packet length thereof. Thus, only with five bits of the packet length part FH1-3 of the minimum fixed length header FH1, it is not possible to represent the packet length. On the other hand, when six bits of the packet length part VH1-1 in the variable length header VH1 is added, representation in 11 bits becomes possible and representation of up to 2048 bytes becomes possible. Also, since it is not considered to divide an input packet, the header 121 is in the variable length mode and has two bytes of the minimum fixed length header FH1 and the variable length header VH1. Here, as illustrated in a second stage from the top in FIG. 6, a packet length of the BBP becomes 1502 (=1500+2) bytes.

Moreover, an input packet 121 is IPv4/UDP, the minimum packet length of the IP packet is 20 bytes, and the minimum packet length of the UDP is eight bytes. Thus, the minimum packet length of the input packet becomes 28 bytes. Thus, in representing the packet length of the BBP 131, 28 bytes are inevitably generated. Accordingly, it is not necessary as information for identification of the packet length. Thus, in 11 bits which are the total of five bits of the packet length part FH1-3 and six bits of the packet length part VH1-1, the packet length is represented by 1474 bytes in which 28 bytes which are the minimum packet length is subtracted from 1502 bytes which are the packet length of the BBP. Thus, when being represented as a binary number, 1474 represented as a decimal number becomes "10111000010".

According to the above information, the header 121 is in the variable length mode. Thus, the header 121 includes the minimum fixed length header FH1 and the variable length header VH1 illustrated in the bottom stage in FIG. 6. A type identification part (Type) FH1-1 of the minimum fixed length header FH1 in FIG. 6 stores "01" indicating the IPv4. A mode identification part (SP) FH1-2 indicating whether a mode is the short packet mode stores "0" indicating that the mode is not the short packet mode. A packet length part (Length MSB) FH1-3 stores "00010" as lower five bits representing an input packet length. Moreover, a packet length part (Length MSB) VH1-1 of the variable length header VH1 stores "101110" as upper six bits representing the input packet length. A frag. part (Frag) VH1-2 stores "0" indicating that the mode is not the division mode and an additional header identification part (Add) VH1-3 stores "0" indicating that there is no additional header.

[Configuration Example of BBF Including BBP in Short Packet Mode]

Next, a configuration example of a BBF including a BBP in the short packet mode will be described with reference to FIG. 7.

Figure 7:
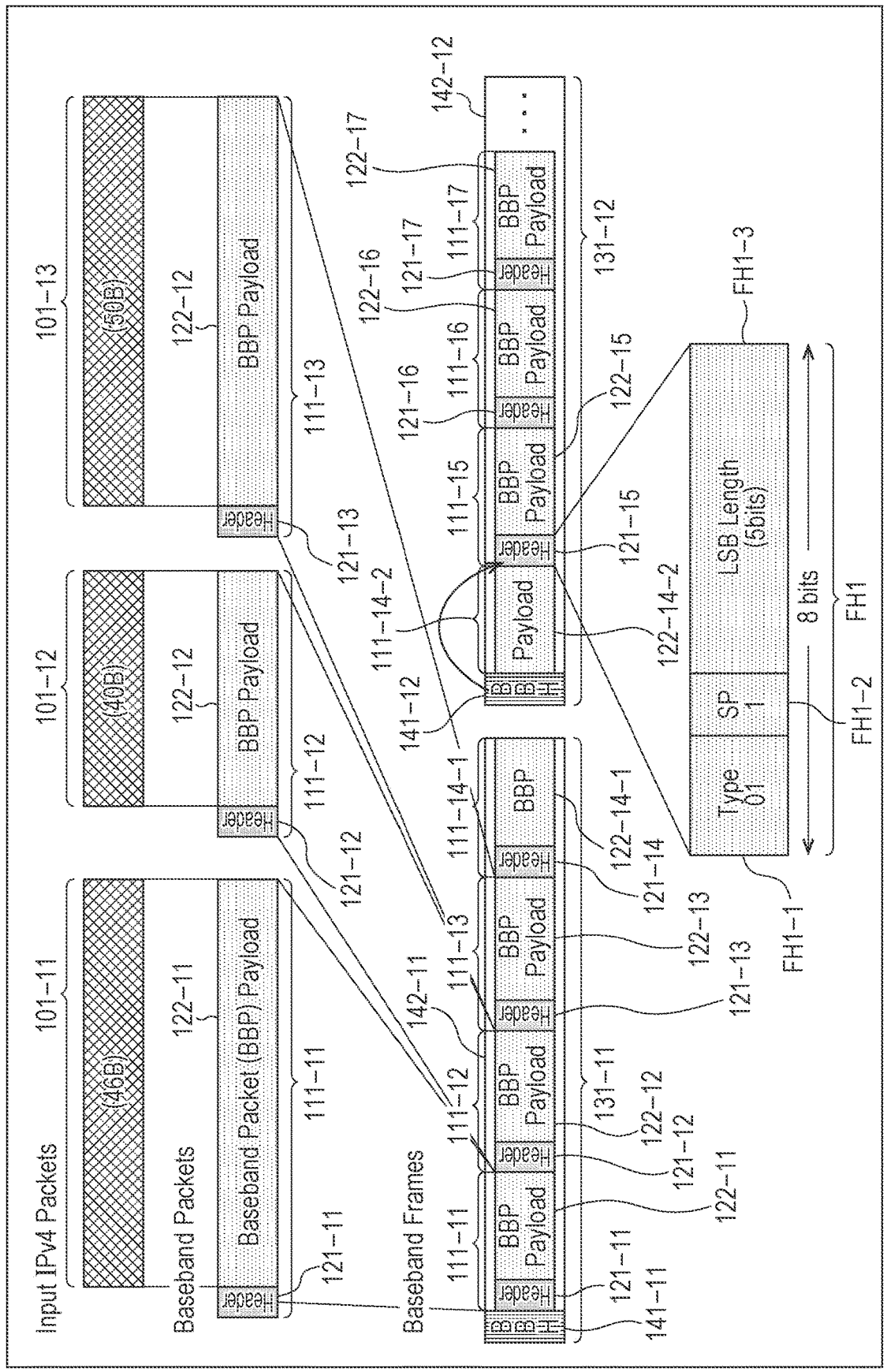
FIG. 7 is a view for describing a configuration example of the BBP and the BBF in a short packet mode.

As illustrated in the top stage in FIG. 7, it is assumed that input packets (input IPv4 packets) 101-11 to 101-13 are input. Here, the input packets 101-11 to 101-13 are, for example, 46 bytes (B), 40 bytes (B), and 50 bytes (B), respectively.

In this case, as illustrated in a second stage from the top in FIG. 7, headers 121-11 to 121-13 are respectively provided to the input packets 101-11 to 101-13 by the BBP generation unit 31 and BBPs 111-11 to 111-13 to which BBP payloads 122-11 to 122-13 are respectively added are generated. Here, the BBP payload 122 is the input packet 101.

Also, the header 121 includes a configuration illustrated in the bottom stage in FIG. 7. Here, the header 121 in the second stage from the top and a header 121 in a third stage from the top include the identical configuration.

That is, since being in the short packet mode, the header 121 only includes the minimum fixed length header FH1. More specifically, 01, 1, information of a packet length of an input packet which information has five bits are respectively stored in the type identification part (Type) FH1-1, a mode identification part (SP) FH-2, and a packet length part (LSB Length) FH-3 of the minimum fixed length header FH1. That is, in the minimum fixed length header FH1 in FIG. 7, it is indicated that the input packet is the IPv4 and a mode is the short packet mode, and information of a packet length which information has five bits is stored.

The BBF generation unit 32 converts a BBP illustrated in the second stage from the top in FIG. 7 into BBFs 131-11 and 121-12 illustrated in the third stage from the top in FIG. 7.

That is, the BBFs 131-11 and 121-12 respectively include headers (BBH) 141-11 and 141-12 and BBF payloads 142-11 and 142-12. Also, as described with reference to FIG. 5, a frame length of the BBF 131 is specified by a code length and a code rate.

As described, a frame length of the BBF 131 is set according to a code length and a code rate. Thus, as illustrated in the third stage from the top in FIG. 7, the BBP 121 is stored into the BBF payload 142 serially from the head for the frame length. As a result, as illustrated in the third stage from the top in FIG. 7, in the BBF 131-11, when the header 141-11 is stored at the start position, the BBPs 111-11 to 111-13 are stored at a position following the header 141-11. However, since it is not possible to store the whole BBP 111-14, a header 121-14-14 of a BBP 111-14-1 which is a part of the BBP 111-14 and a BBP payload 122-14-1 which is a part of the BBP payload 122-14 are stored. Also, in the BBF 131-12, when the header 141-12 is stored at the start position, the other part 122-14-2 of the BBP payload 122-14 of the BBP 111-14-2 which is a part of the BBP 111-14 is stored at a position following the header 141-12 and the BBP 111-15 is stored in the following stage. The header (BBH) 141 has two bytes and stores information of a pointer indicating a head position of the stored BBP. Thus, by combining a header 121-14 of the BBF 131-11, the BBP payload 122-14-1, and the BBP payload 122-14-2 stored at the position following the header 141-12 of the BBF 131-2, it becomes possible to restore the BBP 111-14. Also, based on the information of the header 141-12, a head position where the header 121-15 of the BBP 111-15 is stored can be checked with a pointer, it becomes possible to read the BBP 111-15 stored at the head appropriately.

[Detail Configuration Example of Header of BBP in Short Packet Mode]

Next, a detail configuration example of a header 121 of a BBP 111 in the short packet mode will be described with reference to FIG. 8. Note that here, it is assumed that an IP packet included in the input packet 101 is an Internet protocol version 4 (IPv4)/user datagram protocol (UDP) and that a packet length thereof is 36 bytes.

Figure 8:
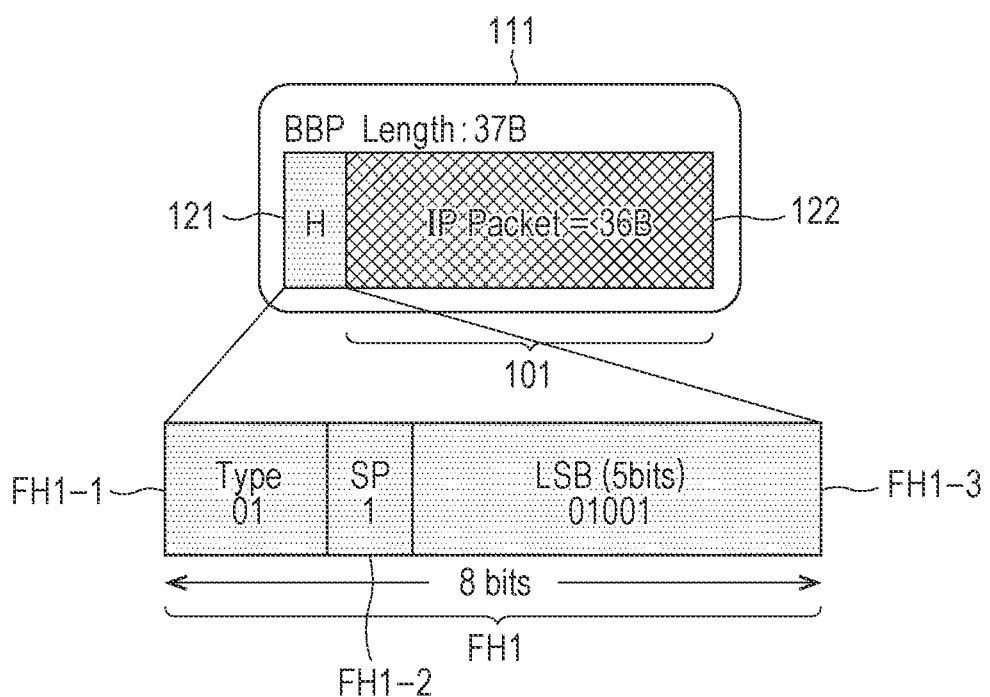
FIG. 8 is a view for describing a configuration example of the header of the BBP in a short packet mode.

That is, as illustrated in the top stage in FIG. 8, since the input packet 101 has 36 bytes, at least six bits are necessary for information of the packet length. However, as described above, 28 B which is the minimum packet length can be offset. Accordingly, one byte of the header 121 is added and the total packet length becomes nine bytes. Thus, it becomes possible to perform representation by five bits of the packet length part FH1-3. More specifically, when being represented as a binary number, 9 expressed as a decimal number becomes 01001.

According to the above information, the header 121 is in the short packet mode. Thus, the header 121 only includes a minimum fixed length header FH1 illustrated in the bottom stage in FIG. 8. A type identification part (Type) FH1-1 of the minimum fixed length header FH1 in FIG. 8 stores "01" indicating the IPv4. A mode identification part (SP) FH1-2 indicating whether a mode is the short packet mode stores "1" indicating that the mode is the short packet mode. A packet length part (MSB) FH1-3 stores "01001" as five bits representing an input packet length.

Note that in the above, since the input packet is IPv4/UDP, an example in which 28 B is offset as the minimum packet length has been described. However, a minimum packet length only needs to be offset according to a type of an input packet. For example, when an input packet is IPv6/UDP, a minimum IP packet length is 40 bytes and a minimum UDP packet length is eight bytes. Thus, in this case, by five bits of the packet length part FH1-3, representation can be performed by a value in which 48 bytes are offset as the minimum packet length.

[Configuration Example of Header of BBP in Additional Variable Length Mode]

Next, a detail configuration of a header 121 of a BBP 111 in the additional variable length mode will be described with reference to FIG. 9. Note that here, it is assumed that an IP packet included in the input packet 101 is an Internet protocol version 4 (IPv4)/user datagram protocol (UDP) and that a packet length thereof is 65533 B. Also, it is assumed that a mode is not the division mode and that an input packet is not divided and is converted into one BBP.

Figure 9:
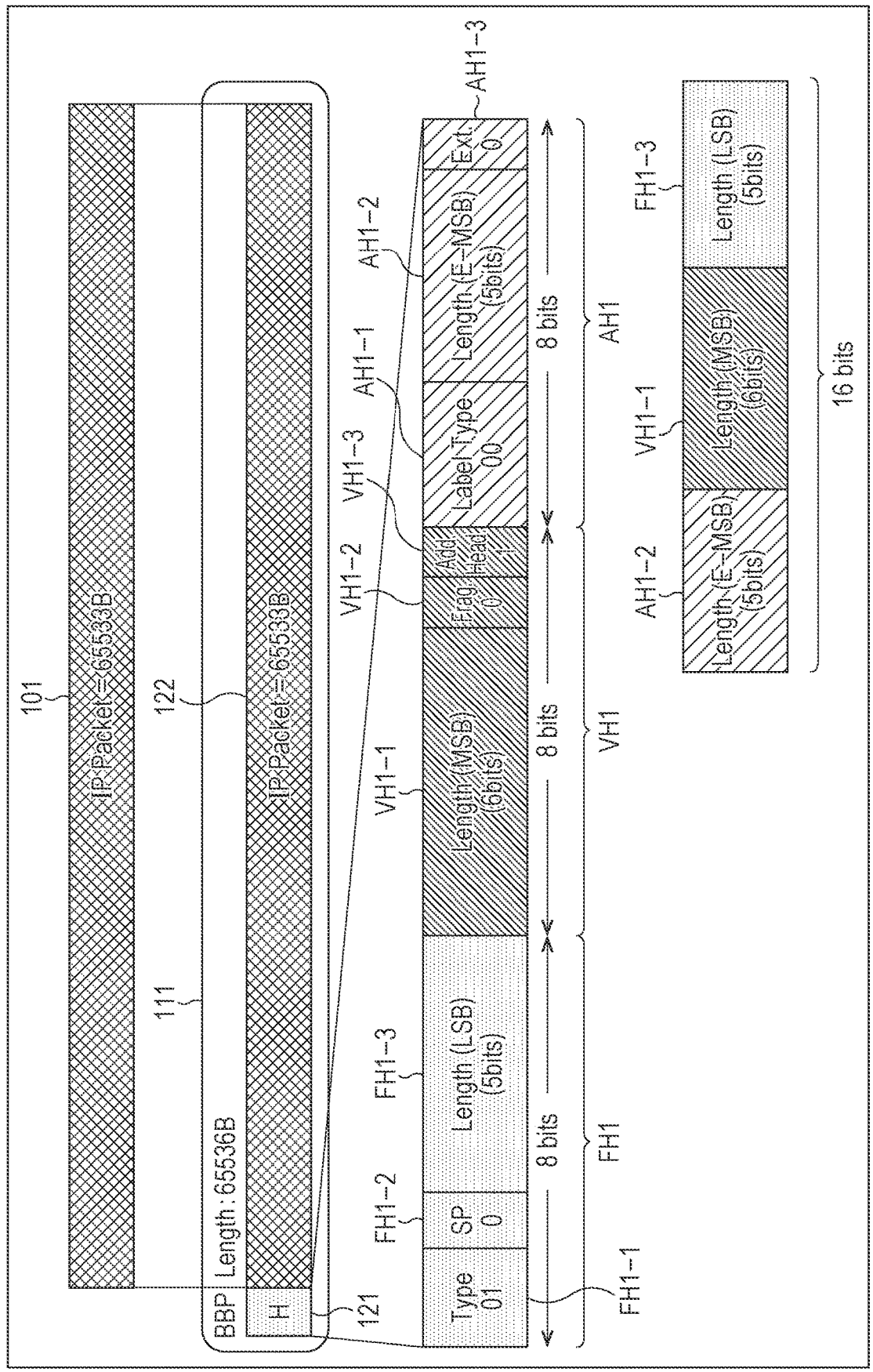
FIG. 9 is a view for describing a configuration example of the header of the BBP in a division mode.

That is, as illustrated in the top stage in FIG. 9, the input packet 101 is 65533 B. Thus, at least 16 bits are necessary for a packet length thereof. Thus, 11 bits which are the total of five bits of the packet length part FH1-3 of the minimum fixed length header FH1 and six bits of the packet length part VH1-1 of the variable length header VH1 is not enough. Accordingly, five bits of a packet length part AH-2 of the additional header AH1 becomes necessary. Thus, the additional header identification part VH1-3 of the variable length header VH1 stores "1" indicating that there is the additional header AH1.

Also, as illustrated in the bottom stage in FIG. 9, the packet length is represented by 16 bits which are the total of five bits of the packet length part FH1-3 of the minimum fixed length header FH1, six bits of the packet length part VH1-1 in the variable length header VH1, and five bits of the packet length part AH-2 of the additional header AH1. Thus, it becomes possible to represent a packet length of up to 65536 bits. However, as illustrated in a third stage from the top in FIG. 9, one byte of each of the minimum fixed length header FH1, the variable length header VH1, and the additional header AH1 is included in the packet length. Thus, only in the header 121 which configures the BBP 111, three bytes are necessary. As a result, as illustrated in the top stage in FIG. 9, the maximum packet length which can be represented as an input packet becomes 65533 B. Also, as illustrated in a second stage from the top in FIG. 9, representation in which a total of the header 121 of the BBP 111 and a BBF payload 122 is up to 65536 B can be performed.

According to the above information, the header 121 is in the additional variable length mode. Thus, as illustrated in the third stage from the top in FIG. 9, the header 121 includes the minimum fixed length header FH1, the variable length header VH1, and the additional header AH1. A type identification part (Type) FH1-1 of the minimum fixed length header FH1 in FIG. 9 stores "01" indicating the IPv4. A mode identification part (SP) FH1-2 indicating whether a mode is the short packet mode stores "0" indicating that the mode is not the short packet mode. A packet length part (Length LSB) FH1-3 stores the least significant five bits representing an input packet length.

Also, a packet length part (Length MSB) VH1-1 of the variable length header VH1 stores six bits higher than the least significant five bits representing the input packet length. A frag. part (Frag) VH1-2 stores "0" indicating that a mode is not the division mode. An additional header identification part (Add Head.) VH1-3 stores "1" indicating that there is an additional header.

Moreover, a label type part AH1-1 of the additional header AH1 stores "00" indicating that a label is not added. A packet length part (Length (E-MSB)) AH1-2 stores the most significant five bits representing the input packet length. An extension header identification part (Ext.) AH1-3 stores "0" indicating that there is no extension header AH2.

As described above, according to the additional variable length mode, it becomes possible to make the header 121 of the BBP 111 have three bytes in total and to control redundancy. For example, a header in generic stream encapsulation (GSE), a type length value (TLV), or the like is set as four bytes. A header in the present technique can be made smaller than the header described above, and thus, redundancy can be controlled.

[Configuration Example of Header of BBP when Division Mode is Used in Variable Length Mode]

Next, a configuration example of a header 121 of a BBP 111 in a case where the division mode is used in the variable length mode will be described with reference to FIG. 10. Note that here, it is assumed that an IP packet included in the input packet 101 is an Internet protocol version 4 (IPv4)/user datagram protocol (UDP) and that a packet length thereof is 65440 B.

Figure 10:
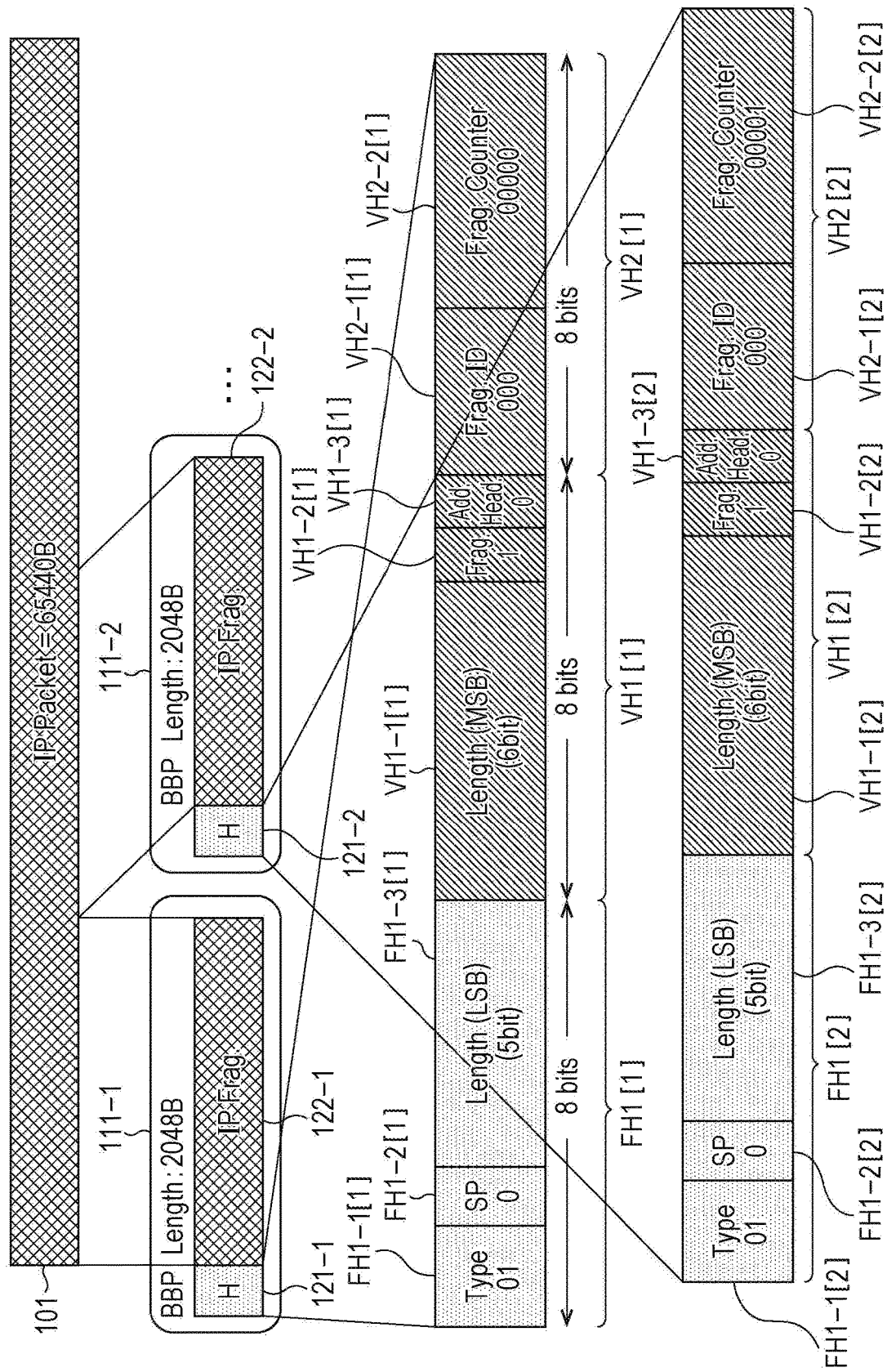
FIG. 10 is a view for describing a configuration example of the header of the BBP in an additional variable length mode.

That is, as illustrated in the top stage in FIG. 10, the input packet 101 has 65440 bytes (B). Also, the header 121 of the BBP 111 is in the variable length mode and the BBP 111 is in the division mode. Thus, in the header 121, 11 bits for representation of a packet length including the packet length part FH1-3 of the minimum fixed length header FH1 and the packet length part VH1-1 of the variable length header VH1 is provided. Thus, a maximum packet length of a BBP generated by division of the input packet 101 becomes 2048 bytes. Here, as illustrated in the bottom stage and a second stage from the bottom in FIG. 10, headers 121-1 and 121-2 respectively include a minimum fixed length header FH1[1], a variable length header VH1[1], and a frag. header VH2[1], and a minimum fixed length header FH1[2], a variable length header VH1[2], and a frag. header VH2[2]. Thus, three bytes are necessary for each header 121.

Thus, the input packet 101 is in a 2045 (=2048-3) byte unit at a maximum. Thus, in the case of FIG. 10, as illustrated in a second stage from the top, in respect to the input packet 101, 32 (=65440/2045) BBPs 111-1 to 111-32 (111-3 and the following are not illustrated) are generated. Here, in the BBPs 111-1 to 111-32, to BBF payloads 122-1 to 122-32 each of which has 2045 bytes which is the input packet divided by 32, the headers 121-1 to 121-32 each of which has three bytes are respectively added. That is, in an example in FIG. 10, each of the BBPs 111-1 to 111-32 has 2048 bytes which is the maximum packet length.

According to the above information, the header 121-1 is in the variable length mode and also in the division mode. Thus, the header 121-1 includes the minimum fixed length header FH1[1], the variable length header VH1[1], and the frag. header VH2[1] illustrated in a third stage from the top in FIG. 10. A type identification part (Type) FH1-1[1] of the minimum fixed length header FH1[1] in FIG. 10 stores "01" indicating the IPv4. A mode identification part (SP) FH1-2[1] indicating whether a mode is the short packet mode stores "0" indicating that the mode is not the short packet mode. A packet length part (Length (MSB)) FH1-3[1] stores lower five bits representing an input packet length. Moreover, a packet length part (Length (MSB)) VH1-1[1] of the variable length header VH1[1] stores upper six bits representing the input packet length. A frag. part (Frag.) VH1-2[1] stores "1" indicating that a mode is the division mode. An additional header identification part (Add) VH1-3[1] stores "0" indicating that there is no additional header AH2. Moreover, a frag. ID part VH2-1[1] of the frag. header VH2[1] stores, for example, "000" as information for identification of an individual divided payload since the frag. ID part VH2-1[1] is at the start. A frag. counter part VH2-2[1] stores, for example, "00000" as a division number for identification of an individual divided payload since the frag. counter part VH2-2[1] is at the head.

On the other hand, the header 121-2 is illustrated in the bottom stage in FIG. 10. Note that the header 121-2 is identical to the header 121-1 other than a point that the frag. counter part VH2-2[2] is different from the frag. counter part VH2-2[1], and thus, description thereof is omitted. That is, as a number following the BBP 111-1, the frag. counter part VH2-2[2] stores "00001".

As described above, by using the division mode, a header is increased and a transmission packet quantity is increased. However, it becomes possible to divide and transmit the input packet 101 having a long packet length. Thus, for example, when it is necessary to transmit a packet having higher priority first, it becomes possible to interrupt transfer of the input packet 101 having a long packet length, to perform interrupt transmission of the packet having high priority first, and to transmit the divided packet again.

[Configuration Example of BBF Including BBP in TS Mode but not in Null Packet Deletion Mode]

Next, a configuration example of the BBF including a BBP which is in the TS mode but not in a null packet deletion mode will be described with reference to FIG. 11.

Figure 11:
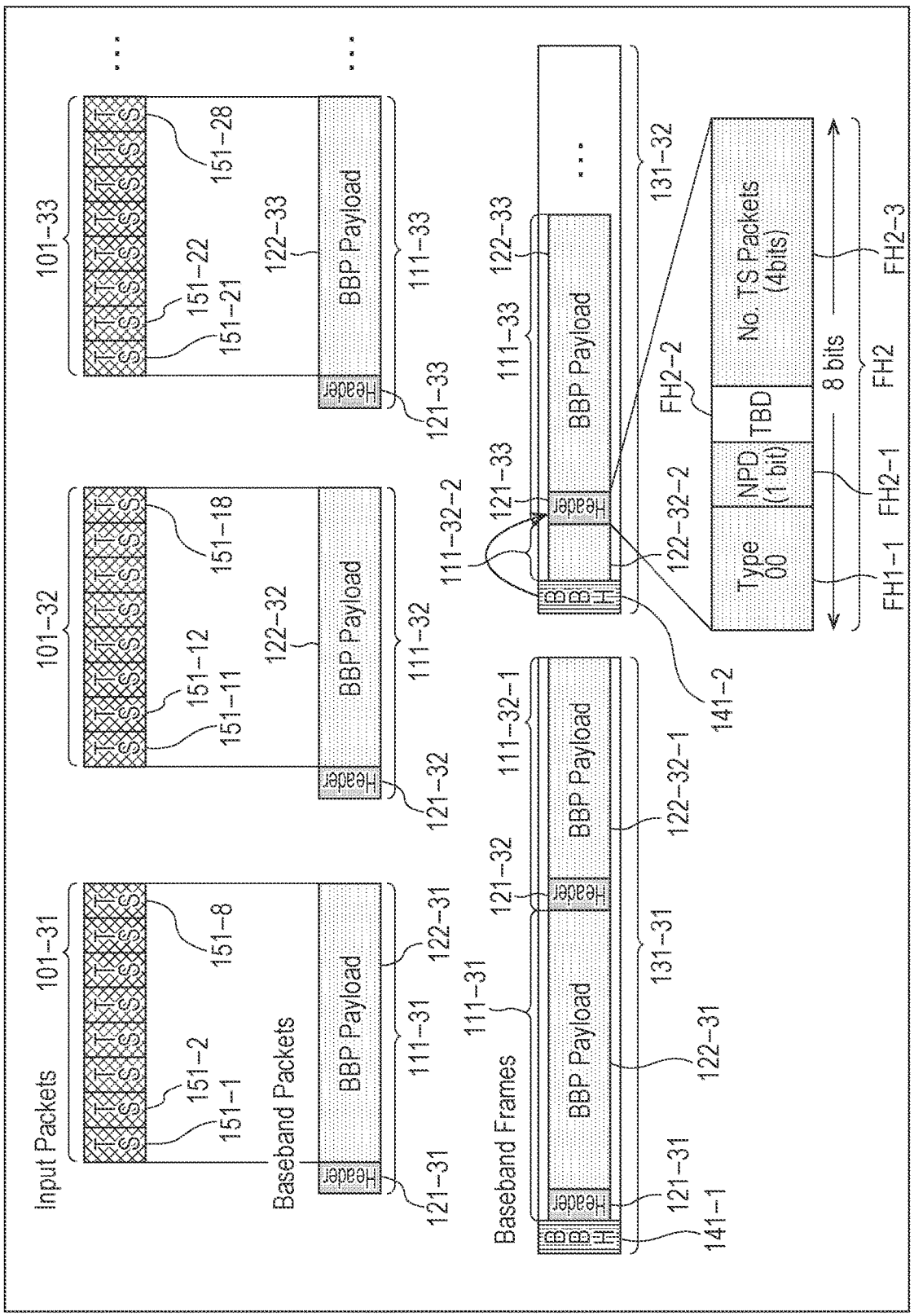
FIG. 11 is a view for describing a configuration example of the BBP and the BBF which are in a TS mode but not in a null packet deletion mode.

As illustrated in the top stage in FIG. 11, it is assumed that input packets 101-31 to 101-33 are input. Here, the input packets 101-31 to 101-33 respectively include TS packets 151-1 to 151-8, TS packets 151-11 to 151-18, and TS packets 151-21 to 151-28. That is, each input packet 101 includes eight TS packets 151. These are set as BBF payloads 122-31 to 122-33 and BBPs 111-1 to 111-3 are configured.

Incidentally, the TS packet 151 illustrated in the top stage in FIG. 11 has 187 bytes although a normal TS packet has 188 bytes. As illustrated in a top stage in FIG. 12, normally, the TS packets 151-1 to 151-8 respectively include sync bytes (0x47) 161-1 to 161-8 each of which has one byte for synchronization, and thus, there are 188 bytes including the sync byte. Thus, in the TS packet 151 illustrated in a second stage in FIG. 11 and the top stage in FIG. 12, a BBF payload 122 is formed in a state in which a sync byte 161 is deleted. Thus, a packet length of the BBF payload 122 becomes 1496 (=187×8) bytes.

Figure 12:
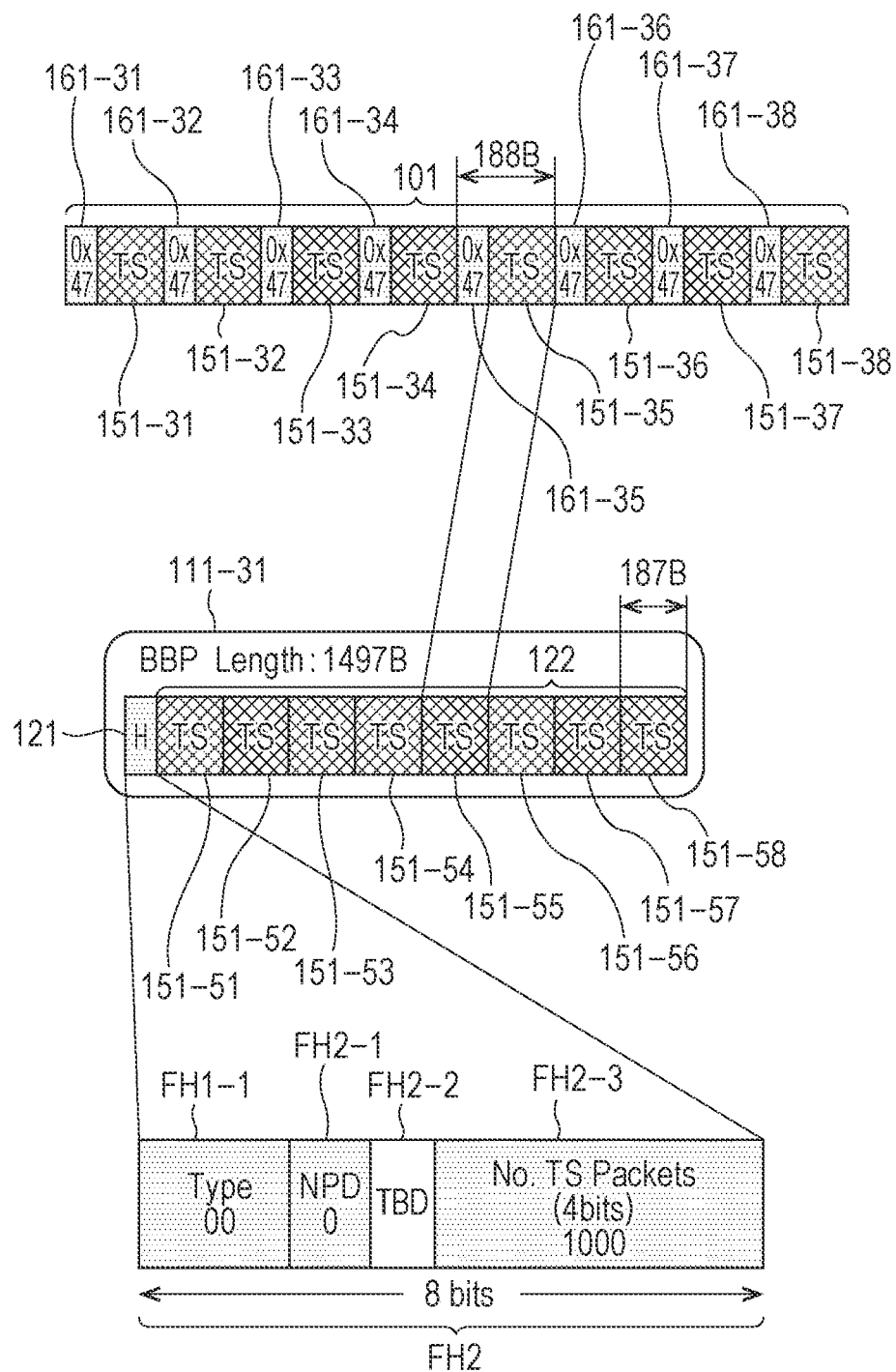
FIG. 12 is a view for describing a configuration example of the header of the BBP which is in the TS mode but not in the null packet deletion mode.

Also, the header 121 includes a configuration illustrated in a bottom stage in FIG. 11 and a bottom stage in FIG. 12. That is, the header 121 includes a TS header FH2 having one byte. More specifically, "00", "0", and eight "1000" as four bits of the number of TS packets are respectively stored in a type identification part (Type) FH1-1, a null packet identification part FH2-1, and a part of the number of TS packets FH2-3 of the TS header FH2. That is, the TS header FH2 in FIG. 12 indicates that the input packet is a TS packet, that a mode is not the null packet deletion mode, and that eight TS packets are included.

A configuration of each of BBFs 131-31 and 131-32 is similar to that of the BBF 131 described with reference to FIG. 4, and thus, description thereof is omitted.

In such a manner, in the TS mode, sync bytes are deleted uniformly from the TS packets included in the BBF payload 122 of the BBP 111. Thus, for example, a total of one byte of the header 121 and 1496 bytes of the BBF payload 122 becomes 1498 bytes although eight normal TS packets have 1504 bytes. Accordingly, it is possible to compress six bytes.

Figure 13:
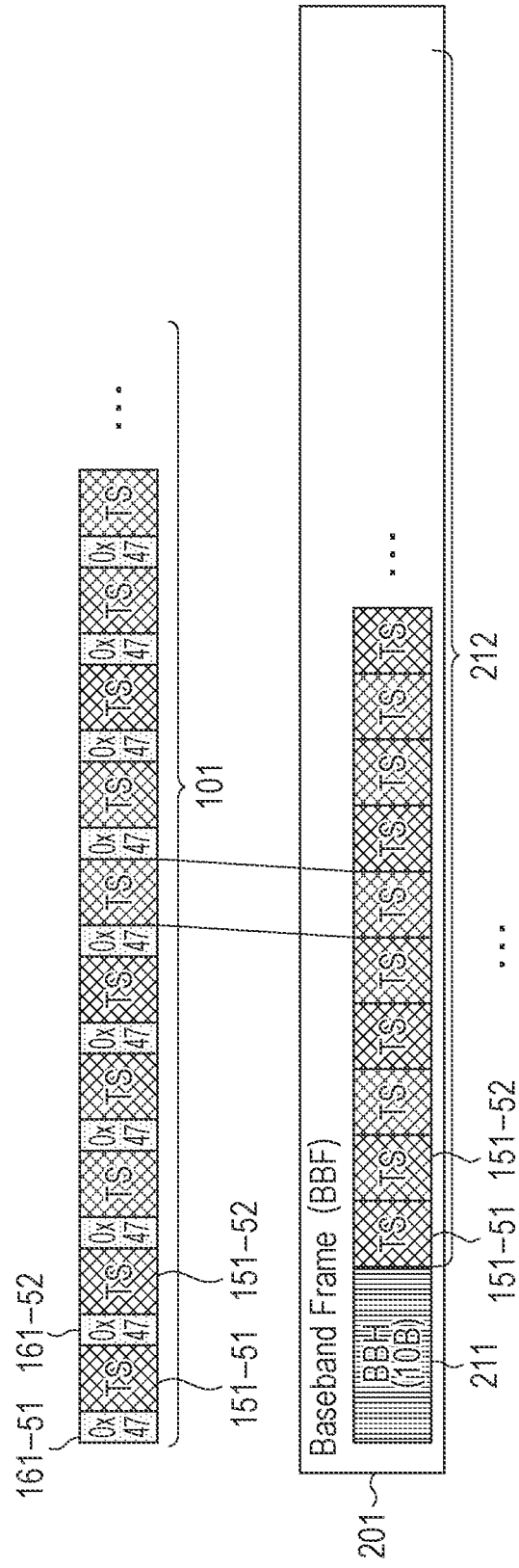
FIG. 13 is a view for describing a configuration example of a BBF in DVB-T2 which is in the TS mode but not in the null packet deletion mode.

Also, for example, in a case of the DVB-T2, there is no concept of a BBP in the TS mode. When a TS packet illustrated in an upper stage in FIG. 13 is input, as illustrated in a lower stage in FIG. 13, a header 211, which has 10 bytes (B), of a BBF 201 is provided and a TS packet from which a sync byte is deleted is stored in a payload 212. Here, information whether there is the null packet deletion mode which will be described later is included in the header 211. Thus, when transmission of a TS packet is started, it becomes not possible to transmit a packet having higher priority first.

On the other hand, in the TS mode of the present technique, it is possible to configure the BBP 111. Thus, even when a packet having high priority is generated during transmission of the TS packet, it is possible to transmit the packet having high priority first.

[Configuration Example of BBP which is in TS Mode and in Null Packet Deletion Mode]

Next, a configuration example of a BBP which is in the TS mode and in the null packet deletion mode will be described with reference to FIG. 14.

Figure 14:
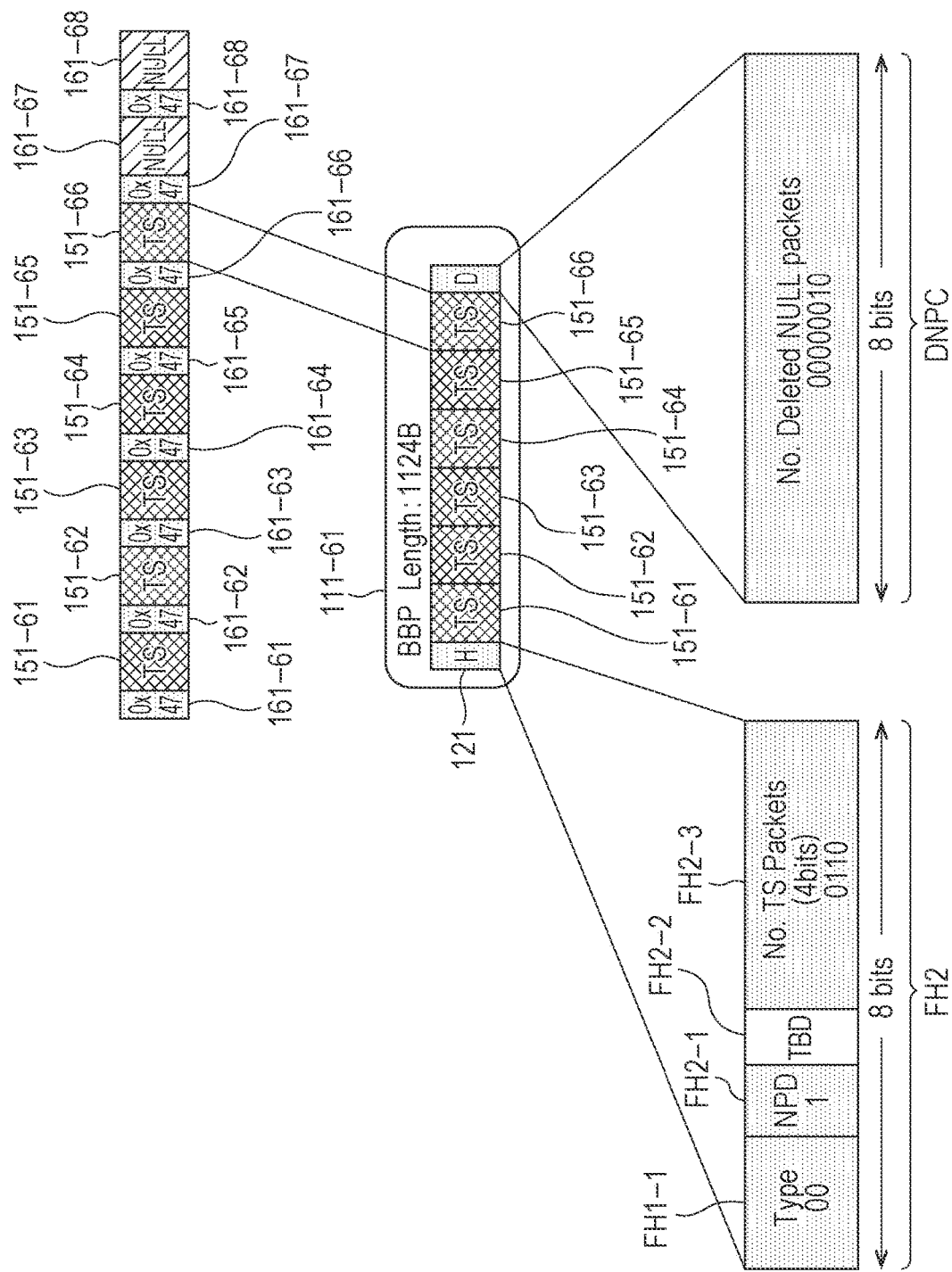
FIG. 14 is a view for describing a configuration example of the BBP which is in the TS mode and in the null packet deletion mode.

As illustrated in the top stage in FIG. 14, input packets respectively include TS packets 151-61 to 151-68, sync bytes 161-61 to 161-68 each of which has one byte being provided at each head position. Among these packets, when the TS packets 151-67 and 151-68 are null packets, a BBP 111-61 is configured in a manner illustrated in a second stage from the top in FIG. 14.

That is, as illustrated in the left bottom stage in FIG. 14, the BBP 111-61 in this case includes a TS header FH2 having one byte, and only the TS packets 151-61 to 151-66 which are not null packets are stored after the TS header FH2. The TS packets 151-67 and 151-68 which are null packets are deleted. Moreover, as illustrated in the right bottom stage in FIG. 14, a part of the number of deleted TS packets DNPC (Deleted Null Packet Counter) which indicates the number of deleted TS packets and which has one byte is stored.

Here, the TS packets 151 are stored in a state in which a sync byte is deleted. Thus, in this example, the BBP 111-61 has 1124 (=1+187×6+1) bytes.

Also, as illustrated in the left bottom stage in FIG. 14, the header 121 includes the TS header FH2 having one byte. More specifically, "00", "1", and six "0110" as four bits of the number of TS packets are respectively stored in a type identification part (Type) FH1-1, a null packet identification part FH2-1, and a part of the number of TS packets FH2-3 of the TS header FH2. That is, the TS header FH2 in FIG. 14 indicates that the input packet is the TS packet, that a mode is the null packet deletion mode, and that six TS packets are included in the BBP 111-61.

Moreover, as illustrated in the right bottom stage in FIG. 14, a part of the number of deleted TS packets DNPC which has one byte is set in the following stage of the TS packet 151-66. In this example, since the two TS packets 151-6 and 151-68 are deleted, "00000010" is registered.

Note that only when there are null TS packets to be deleted continuously among the TS packets 151 included in one BBP 111, a plurality of TS packets 151 can be deleted in the one BBP 111. Thus, in a case of the null packet deletion mode, when a null packet and a TS packet 151 which is not a null packet exist alternately, a BBP 111 including one TS packet 151 is configured and a BBP in which the header 121 and the part of the number of deleted TS packets DNPC are provided is provided is configured.

Figure 15:
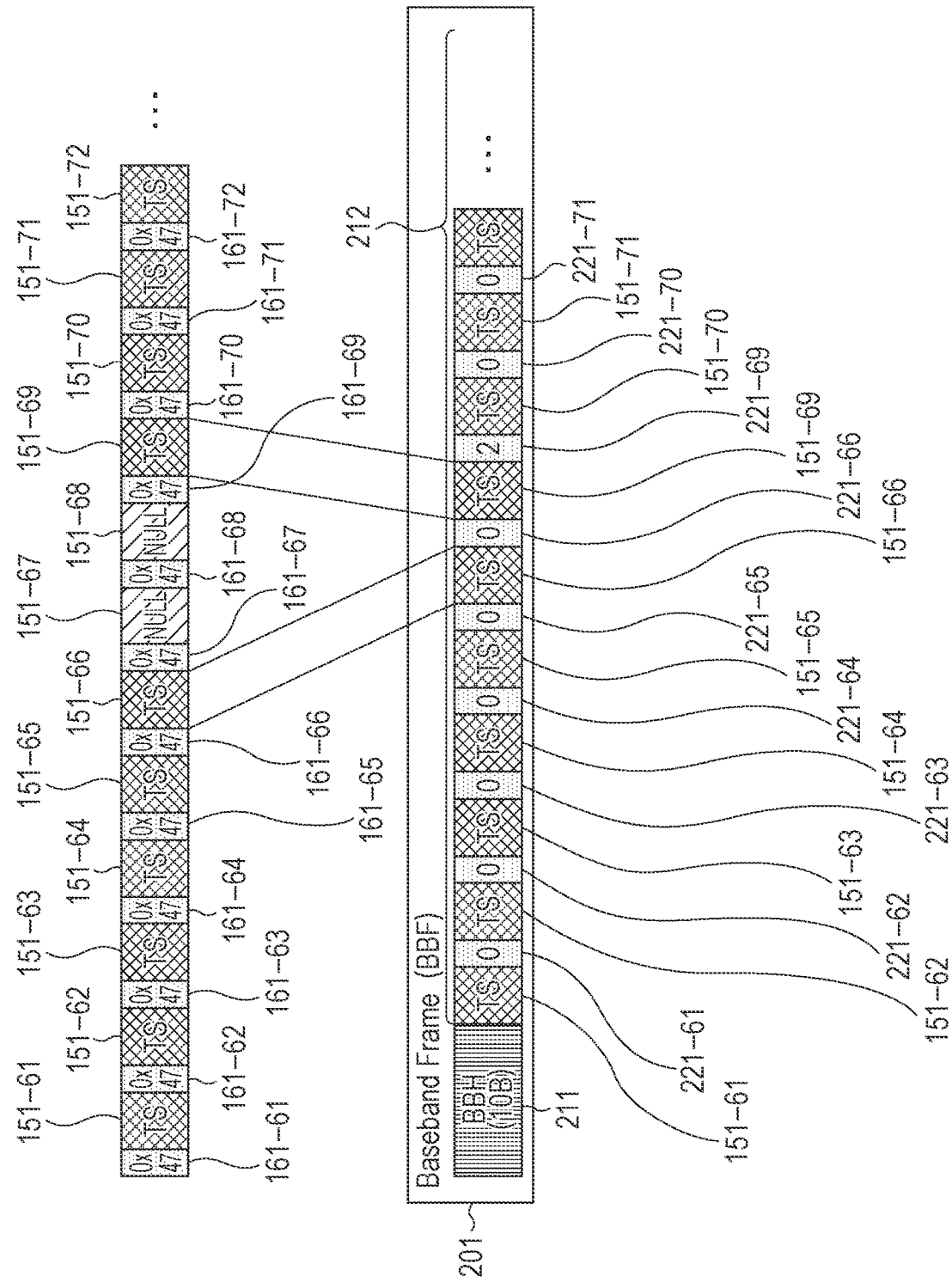
FIG. 15 is a view for describing a configuration example of the BBF in the DVB-T2 which is in the TS mode and in the null packet deletion mode.

Incidentally, in a case of DVB-T2, there is also a null packet deletion mode. More specifically, as illustrated in the upper stage in FIG. 15, in a case where TS packets 151-61 to 151-70 are input and when the TS packets 151-67 and 151-68 are null packets, a configuration illustrated in the lower stage in FIG. 15 is included.

That is, as described above, there is no concept of a BBP in the TS mode in DVB-T2. Thus, a BBF 201 is configured and information indicating that a mode is the null packet deletion mode is stored into a header 211 having 10 bytes. Moreover, a following payload 212 includes a configuration in which a part of the number of deleted packets 221 having one byte is provided in the following stage of the TS packet 151. Then, in a part of the number of deleted packets 221-69 in the following stage of the TS packet 151-69 arranged after the TS packets 151-67 and 151-68 are deleted, information indicating that two packets are deleted is stored. Thus, regardless of whether there is a deleted TS packet, in the following stage of the recorded TS packet 151, the part of the number of deleted packets 221 having one byte is provided necessarily and information of the number of deleted TS packets is registered.

On the other hand, in the present technique, regardless of whether there is deletion, only a part of the number of deleted packets DNPC having one byte is provided to one BBP. Thus, it is possible to control redundancy sufficiently in configuring a BBF. Also, even in a case of transmitting a TS packet, it is possible to configure the BBP 111. Thus, even when a packet having high priority is generated during transmission of the TS packet, it becomes possible to perform interrupt transmission first.

[Configuration Example of Header of BBP in Continuous Bit Stream Packet]

Next, a configuration example of a header of a BBP in a case where an input packet is a continuous bit stream packet will be described with reference to FIG. 16.

Figure 16:
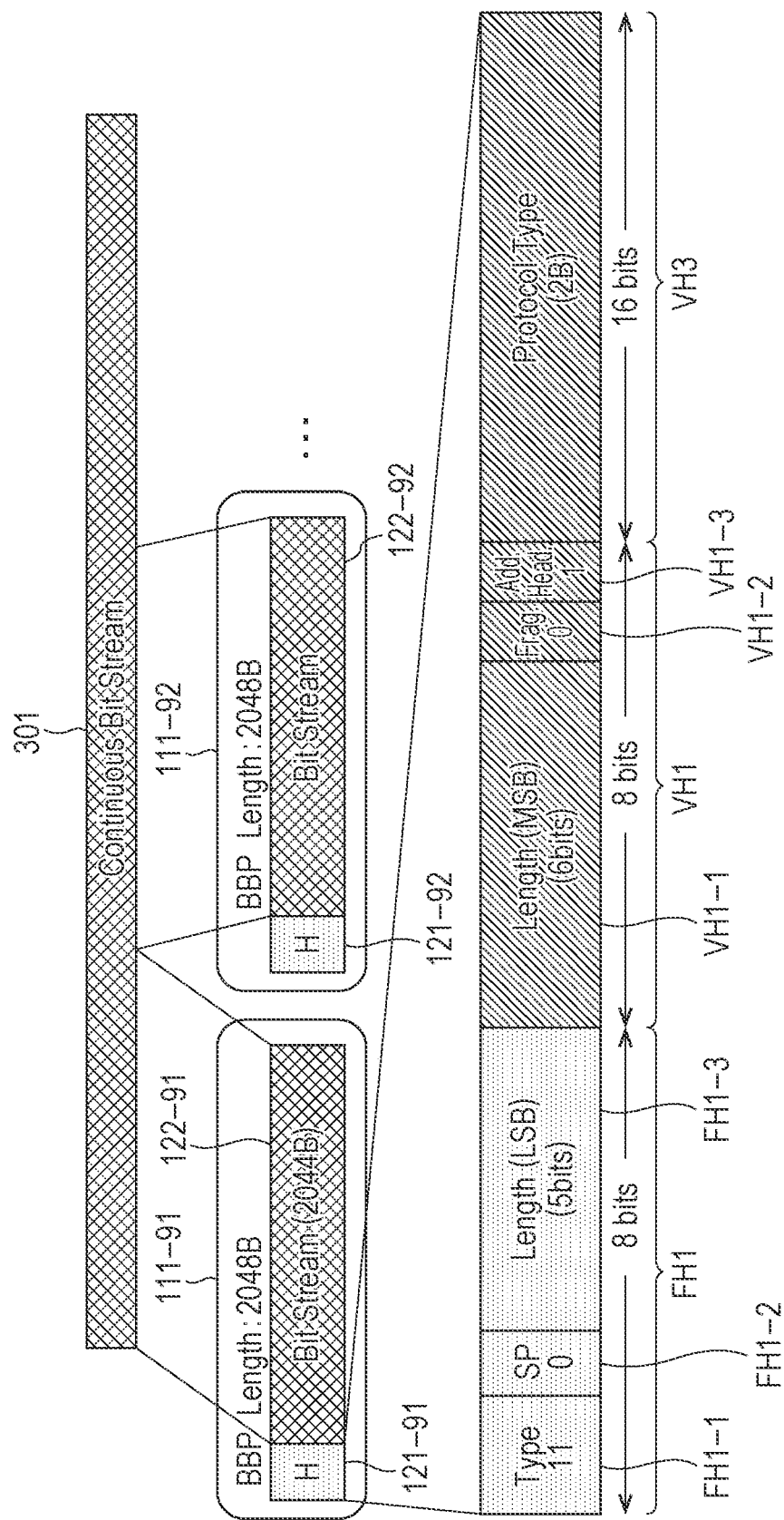
FIG. 16 is a view for describing a configuration example of the header of the BBP when a continuous bit stream packet is transmitted.

As illustrated in the top stage in FIG. 16, it is assumed that a continuous bit stream 301 is input as an input packet.

In this case, as illustrated in a second stage from the top in FIG. 16, the continuous bit stream 301 is divided in a 2044 byte unit by the BBP generation unit 31. In each of the divided piece of the continuous bit stream 301, headers 121-91, 121-92 . . . are respectively provided and BBPs 111-91, 111-92 . . . to which BBP payloads 122-91, 122-92 . . . including the pieces of continuous bit stream are added are generated. Here, the BBP payload 122 is the input continuous bit stream divided in a 2044 byte unit. Thus, since each BBP 111 includes the header 121 having four bytes and the BBP payload 122 having 2044 bytes, a packet length thereof is 2048 bytes which is the maximum packet length.

Also, the header 121 includes a configuration illustrated in the bottom stage in FIG. 16. That is, the header 121 includes a minimum fixed length header FH1, a variable length header VH1, and a protocol type header VH3. More specifically, 11, 0, and a packet length of the input packet are respectively stored in a type identification part (Type) FH1-1, a mode identification part (SP) FH-2, and a packet length part (Length (LSB)) FH-3 of the minimum fixed length header FH1. That is, in the minimum fixed length header FH1 in FIG. 16, it is indicated that a type of the input packet is the other type (other) and that a mode is not the short packet mode. Also, the lower five bits are stored as information of a packet length having five bits.

Also, in the packet length part VH1-1, the flag part (flag) VH1-2, and the additional header identification part VH1-3 of the variable length header VH1, 6 bits of a packet length, 0, and 1 are respectively stored. That is, in the variable length header VH1 in FIG. 16, upper six bits of a packet length of a BBP payload which is an input packet are stored and it is indicated that a mode is not the division mode and that there is an additional header. That is, it is indicated that there is the protocol type header VH3 as an additional header.

Information of the packet length of the BBP 111 including the packet length parts FH1-1 and VH1-1 and having 11 bits is stored.

Moreover, the protocol type header VH3 stores information of a protocol type of a continuous bit stream which is an input packet having two bytes (16 bits).

According to the above information, the header 121 in FIG. 16 includes the minimum fixed length header FH1, the variable length header VH1, and the protocol type header VH3 illustrated in the bottom stage in FIG. 16. Also, a type identification part (Type) FH1-1 of the minimum fixed length header FH1 in FIG. 16 stores "11" indicating the other type (other). A mode identification part (SP) FH1-2 indicating whether a mode is the short packet mode stores "0" indicating that the mode is not the short packet mode. A packet length part (Length (MSB)) FH1-3 stores "11111" as lower five bits representing an input packet length. Moreover, a packet length part (Length (MSB)) VH1-1 of the variable length header VH1 stores "111111" as upper six bits representing the input packet length. That is, in a case of FIG. 16, it is indicated that a packet length of the BBP 111 is 2048 bytes which is the maximum packet length. A flag part (flag) VH1-2 stores "0" indicating that a mode is not the division mode. An additional header identification part (Add. Head) VH1-3 stores "1" indicating that there is a protocol type header VH3 which is an additional header. Then, the protocol type header VH3 stores information of a protocol type of a continuous bit stream stored in the BBP payload 122.

By such a configuration, a BBP can be configured from various types of continuous bit streams and can be transmitted/received.

Note that as header compression technique of the IPv4 and the IPv6, technique of robust header compression (RoHC) is widely known. The RoHC is good for compression of an IP header. However, processing is complicated and there are various kinds of processing. Also, compression in a unidirectional mode (U-mode) suitable for broadcasting is low compared to a bidirectional mode, and thus, the RoHC is not necessarily implemented. However, in the present technique, it is possible to support the RoHC. That is, as illustrated in FIG. 16 described above, 11 is stored and information indicating the other is registered in the type identification part (Type) FH1-1 of the minimum fixed length header FH1 and information of the RoHC is stored in the protocol type header VH3. Thus, it becomes possible to define the RoHC as a header. Also, other than what has been described above, various kinds of compression method can be employed by a similar method.

[Configuration Example of BBH in BBF]

Next, a configuration example of a BBH in a BBF will be described with reference to FIG. 17.

Figure 17:
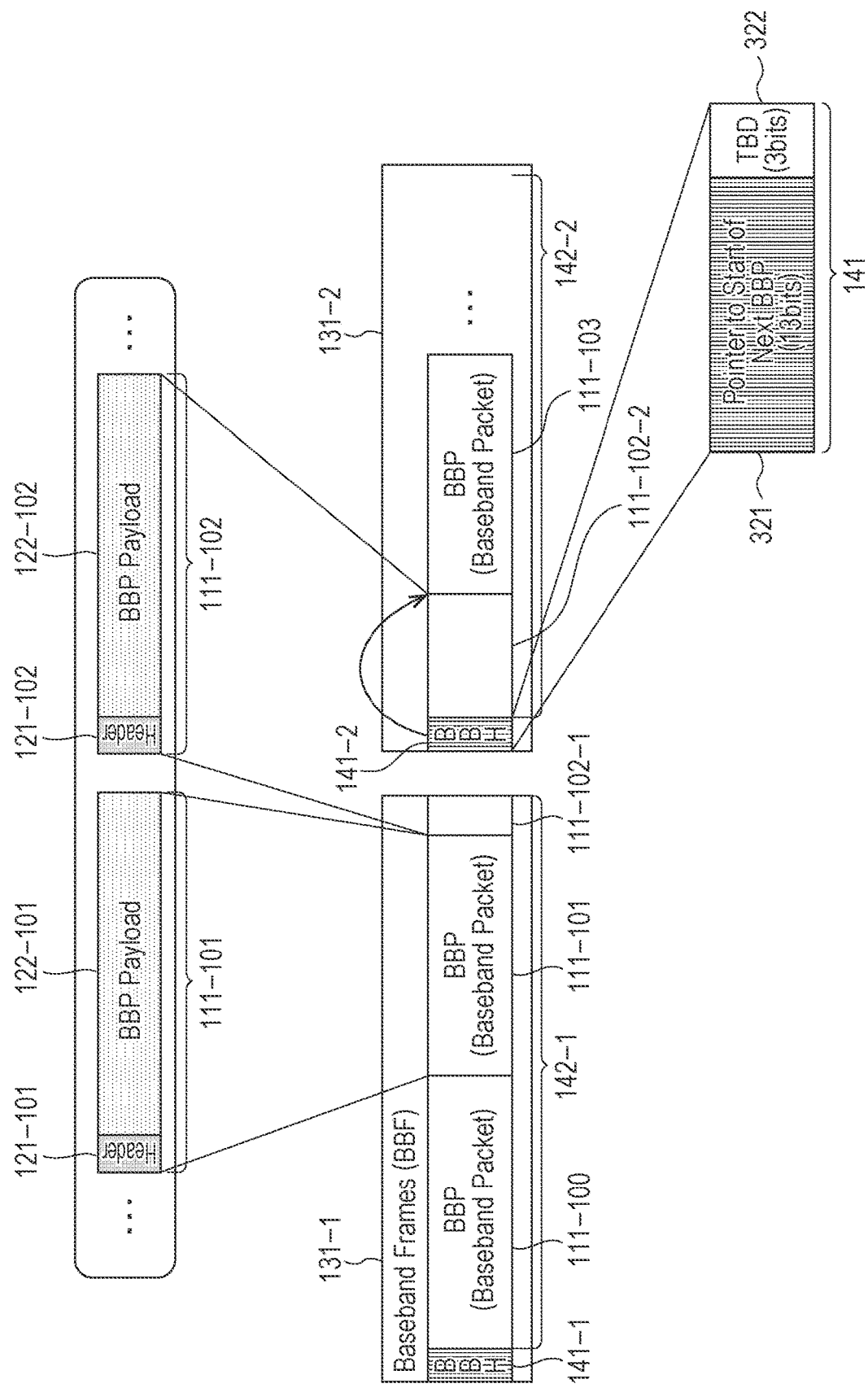
FIG. 17 is a view for describing a configuration example of the BBH of the BBF.

For example, when BBPs 111-101, 111-102 . . . , which includes headers 121-101, 121-102 . . . and BBP payloads 122-101, 122-102 . . . , such as what illustrated in the top stage in FIG. 17 are input, the BBF generation unit 32 generates BBFs 131-1, 131-2 . . . as illustrated in a second stage in FIG. 17.

That is, as illustrated in the second stage from the top in FIG. 17, the BBF generation unit 32 configures the BBFs 131-1, 131-2 . . . each of which has a data length set according to a packet length and a code rate of an input packet. More specifically, the BBF generation unit 32 stores, for example, a BBH 141-1 at the start position of a BBF 251-1 and serially stores, in a following stage thereof, BBPs 111-100, 111-101 . . . in such a manner that a BBF has a set data length. Here, as illustrated in the second stage in FIG. 17, when it is not possible to store the whole BBP 111-102, a part thereof is stored as BBP 111-102-1, a BBH 141-2 is stored at the head of the next BBF 131-2, and the remaining stage of the BBP 111-102 is stored as BBP 111-102-2. Then, the BBF generation unit 32 successively and continuously perform processing to store the BBP 111-103 . . . until a data length of the BBF 252-2 is realized.

Here, the BBF generation unit 32 controls the BBH adding unit 41 to store a BBH 141, which is illustrated in a configuration example in a lower right part in FIG. 17, at the start position of each BBF 131. That is, the BBH 141 has two bytes (16 bit) and stores information of a pointer indicating a start position, on the BBF 131, of the BBP 111 stored from the head in a pointer storage part (Pointer to Start of Next BBP) 321 having 13 bits at the head. That is, in a case of the second stage in FIG. 17, in a BBH 141-2, in order to store a BBP 111-102-2 which is not stored in the BBF 131-1 in a preceding stage and which is to be in a following stage of the BBP 111-102, a start position of a BBP 111-103 which is newly stored from the head is stored as a pointer, as illustrated with an arrow. Note that three bits of the BBH 141 are set as a null region (TBD) 322.

Figure 18:
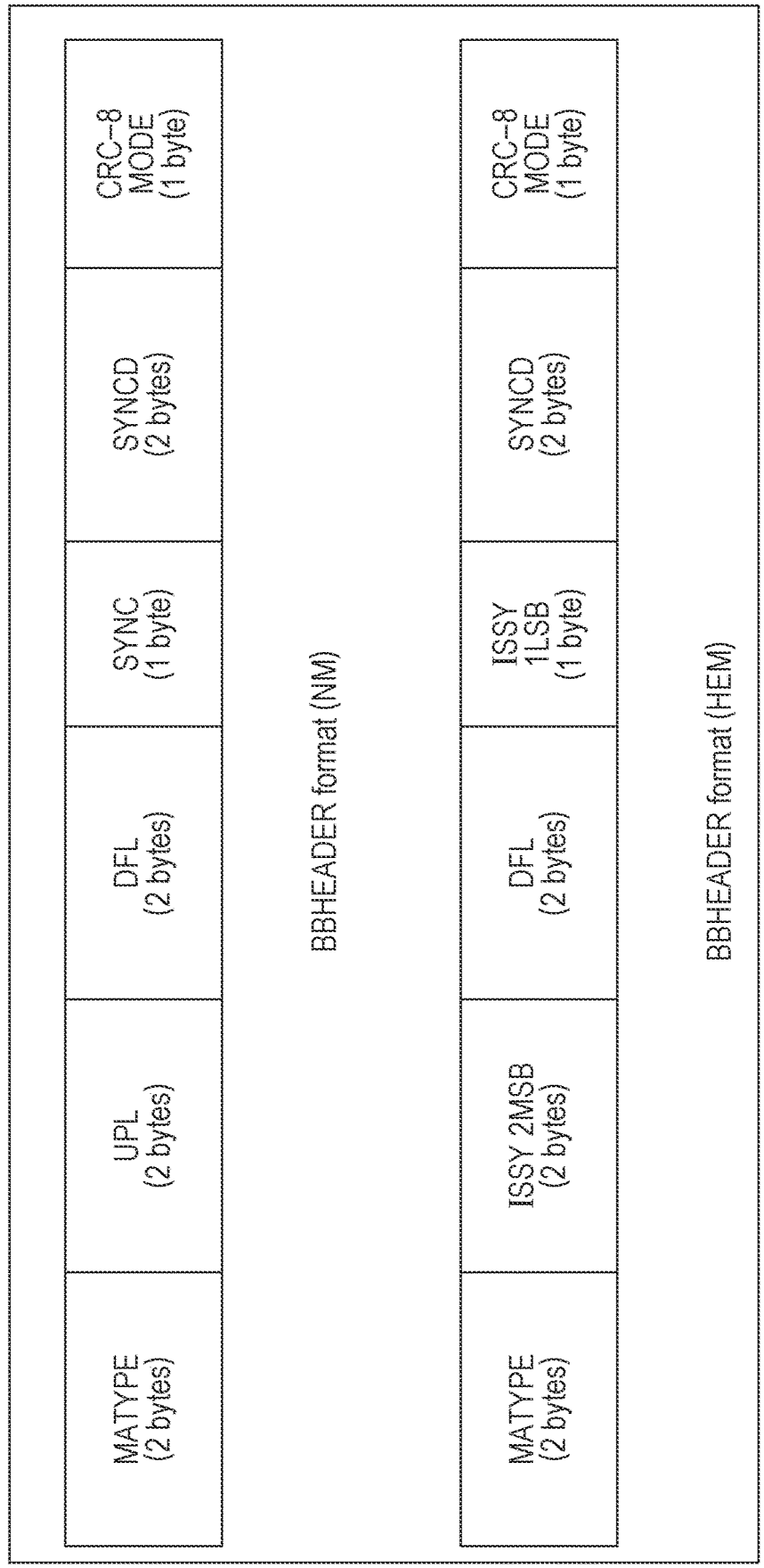
FIG. 18 is a view for describing a configuration example of the BBH of the BBF in the DVB-T2.

Incidentally, a BBH in a BBF in the DVB-T2 includes a configuration illustrated in FIG. 18. Here, a BBH in a normal mode is illustrated in an upper stage in FIG. 18 and a BBH in a high efficiency mode is illustrated in a lower stage.

In either mode, the BBH in the DVB-T2 has 10 bytes. In a case of the normal mode, the BBH includes MATYPE (two byte), UPL (two byte), DFL (two byte), SYNC (one byte), SYNCD (two byte), and CRC-8MODE (one byte). Also, in a case of the high efficiency mode, the BBH includes MATYPE (two byte), ISSY 2MSB (two byte), DFL (two byte), ISSY LSB (one byte), SYNCD (two byte), and CRC-8MODE (one byte).

The MATYPE represents an input stream format, the user packet length (UPL) represents a user packet length, the data field length (DFL) represents a data length in a data field, and the SYNC represents a so-called sync byte. Also, the SYNOD represents a distance from a start position of a data field to a start position of data, the CRC-8MODE represents a mode in CRC-8, and each of the input stream synchronization indicator (ISSY) LSB and the ISSY 2MSB represents input stream synchronization detection information.

That is, in the DVB-T2, the BBH includes a large quantity and various types of data. Thus, in addition to complication of processing itself, a quantity of distributed data is increased since a data length of the BBH is long.

On the other hand, as described above, in the BBH of the present technique, stored information is only a pointer indicating a start position of a BBP newly stored from a head in each BBF. Thus, in reading, processing after reception is easy and it is possible to control a quantity of data.

Also, according to such a structure, when extracting a BBP 111 from serially-supplied BBFs 131, the BBP extraction unit 73 in the reception apparatus 51 only needs to extract the BBF 131 from a head position based on the information of the BBH 141. Thus, it becomes possible to extract the BBP 111 easily and appropriately. As a result, faster and more secure packet communication can be realized.

[Transmission/Reception Processing by Transmission Apparatus and Reception Apparatus]

Figure 19:
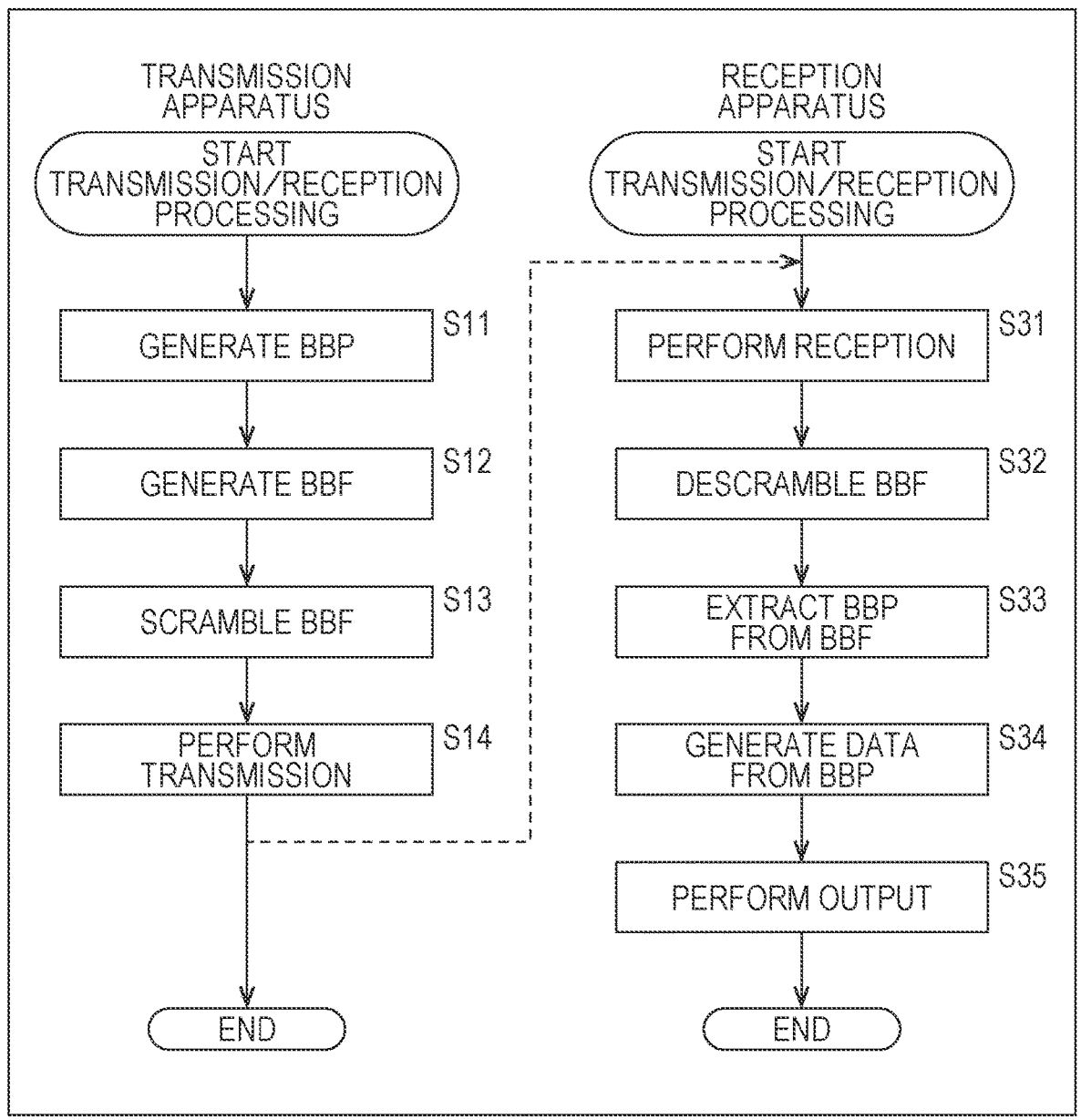
FIG. 19 is a flowchart for describing transmission/reception processing by the transmission apparatus and the reception apparatus of the present technique.

Next, transmission/reception processing by the transmission apparatus 11 in FIG. 1 and the reception apparatus 51 in FIG. 2 will be described with reference to a flowchart in FIG. 19.

In step S11, based on an input packet, the BBP generation unit 31 generates a BBP by the above-described processing and supplies the generated BBP to the BBF generation unit 32. More specifically, the BBP generation unit 31 identifies a type of an input packet. When the input packet is an IP packet, according to a packet length of the input packet, the BBP generation unit 31 generates a BBP in the short packet mode described with reference to FIG. 7, the variable length mode described with reference to FIG. 4, or the additional variable length mode described with reference to FIG. 9. Also, when the input packet is a TS packet, the BBP generation unit 31 generates a BBP in the TS packet mode described with reference to FIG. 11 or FIG. 14. Moreover, when the input packet is not an IP packet or a TS packet, the BBP generation unit 31 registers information of a recognized type into a protocol header VH3 and generates a BBP in a manner similar to generation of a BBP from the continuous bit stream packet described with reference to FIG. 15. Also, when necessary, the BBP generation unit 31 generates a header corresponding to the division mode or the null packet deletion mode and generates a BBP.

In step S12, based on the supplied BBP, the BBF generation unit 32 generates a BBF and supplies the generated BBF to the BBF scrambler 33. More specifically, the BBF generation unit 32 controls the BBH adding unit 41 to generate information of a pointer indicating a start position of a BBP newly stored from a head in each BBF by the above-described method and to store the generated information at the start position of the BBF. Moreover, the BBF generation unit 32 generates a BBF by serially storing a BBP into a BBF having a frame length set according to a code length and a code rate of an input packet and supplies the generated BBF to the BBF scrambler 33.

In step S13, the BBF scrambler 33 scrambles the supplied BBF and supplies the scrambled BBF to the transmission unit 34.

In step S14, the transmission unit 34 transmits the scrambled BBF to the reception apparatus 51.

In step S31, the reception unit 71 of the reception apparatus 51 receives the BBF transmitted from the transmission apparatus 11 and supplies the received BBF to the BBF descrambler 72.

In step S32, the BBF descrambler 72 descrambles the supplied scrambled BBF and supplies the descrambled BBF to the BBP extraction unit 73.

In step S33, the BBP extraction unit 73 serially extracts a BBP from the descrambled BBF. More specifically, the BBP extraction unit 73 controls the BBH recognition unit 73*a* to recognize information of a pointer indicating a start position of a BBP newly stored from a head in each BBF recorded in a BBH in a BBF, and serially extracts the BBP in the BBF, and supplies the extracted BBP to the input packet generation unit 74.

In step S34, the input packet generation unit 74 generates an input packet, which is input into the transmission apparatus 11, from the BBP supplied by the BBP extraction unit 73.

In step S35, the input packet generation unit 74 outputs the generated input packet.

According to the above processing, an input packet is converted into the above-described BBP and a BBF is generated based on the converted BBP. Then, transmission is performed based on the BBF and a BBP is generated based on the received BBF. From the BBP, an input packet is generated. As a result, redundancy of a transmitted/received packet is controlled and fast and secure packet communication can be realized.

Note that an embodiment of the present technique is not limited to the above-described embodiments and various modifications can be made within the spirit and the scope of the present technique.

For example, each step described with reference to the above flowchart is not only executed by one apparatus but also can be executed by a plurality of apparatuses.

Moreover, when one step includes a plurality of kinds of processing, the plurality of kinds of processing included in the one step can be not only executed by one apparatus but also by a plurality of apparatuses.

Also, the present technique may include the following configurations.

(1) A transmission apparatus including: a baseband packet generation unit configured to generate a baseband packet from an input packet or a stream; a baseband frame generation unit configured to generate a baseband frame from the baseband packet; and a transmission unit configured to transmit the baseband frame, wherein a header of the baseband packet includes a minimum fixed length header including type identification information for identification of a type of the input packet or the stream and information of a packet length of the input packet or the stream stored in a payload of the baseband packet.

(2) The transmission apparatus according to (1), wherein when the type identification information indicates that the type of the input packet or the stream is an IP packet, the minimum fixed length header includes, in addition to the type identification information, minimum fixed length identification information for identification whether the input packet length is a minimum fixed length, and minimum input packet length information as information of the input packet length.

(3) The transmission apparatus according to (2), wherein when the minimum fixed length identification information indicates that the input packet length is not the minimum fixed length, the header includes a variable length header in addition to the minimum fixed length header, and when the minimum input packet length information is set with lower bits of the input packet length as the minimum input packet length, the variable length header includes variable packet length information including upper bits thereof, a division flag to indicate whether the input packet or the stream is divided and a baseband packet is configured, and an additional header flag indicating whether there is an additional header to be added to the variable length header.

(4) The transmission apparatus according to (3), wherein when the division flag indicates that the input packet or the stream is divided and the baseband packet is configured, the variable length header further includes a division frag. header, and the division frag. header includes a frag. ID for identification of the input packet of the stream, and a frag. counter to be information for identification of the divided baseband packet.

(5) The transmission apparatus according to (3), wherein when the additional header flag indicates that there is the additional header, the header includes the additional header in addition to the minimum fixed length header and the variable length header, and the additional header includes additional header identification information for identification of a type of the additional header, extension packet length information including bits higher than that of the variable packet length information representing the input packet length, and additional information header flag indicating whether there is an additional information header.

(6) The transmission apparatus according to (5), wherein when the additional information header flag indicates that there is the additional information header, the header includes the additional information header, which includes predetermined information, in addition to the minimum fixed length header, the variable length header, and the additional header.

(7) The transmission apparatus according to (5), wherein when the additional header identification information indicates label information, the header includes the additional information header, which includes predetermined label information, in addition to the minimum fixed length header, the variable length header, and the additional header.

(8) The transmission apparatus according to (1), wherein the baseband packet generation unit identifies the type of the input packet or the stream, registers the identified type into a type identification part, and generates a baseband packet corresponding to the identified type.

(9) The transmission apparatus according to (1), wherein the minimum input packet length information is information having a minimum fixed length and including bit information in which the number of bits corresponding to a minimum packet size is offset.

(10) The transmission apparatus according to (1), wherein when the type identification information is a transport stream packet, the minimum fixed length header includes, in addition to the type identification information, null packet deletion information for identification whether a null packet in the transport stream packet is deleted and a baseband packet is configured, and information of the number of transport stream packets, which information indicates the number of transport stream packets, as information of the input packet length included in the baseband packet.

(11) The transmission apparatus according to (10), wherein when the packet deletion information is information indicating that the null packet in the transport stream packet is deleted and the baseband packet is configured, the header further includes information indicating the number of deleted null packets.

(12) The transmission apparatus according to (1), wherein the type identification information includes unspecified protocol information indicating a protocol other than that of information for specification of a protocol of the input packet or the stream, and when the type identification information is the unspecified protocol information, the header includes, in addition to the minimum fixed length header, predetermined protocol information for specification of a predetermined protocol.

(13) A transmission method including: generating a baseband packet from an input packet or a stream; generating a baseband frame from the baseband packet; and transmitting the baseband frame, wherein a header of the baseband packet includes a minimum fixed length header including type identification information for identification of a type of the input packet or the stream and information of a packet length of the input packet or the stream stored in a payload of the baseband packet.

(14) A reception apparatus including: a reception unit configured to receive a transmitted signal including a baseband frame; a baseband packet generation unit configured to generate a baseband packet from the received baseband frame; and an input packet generation unit configured to generate an input packet or a stream from the baseband packet, wherein a header of the baseband packet includes a minimum fixed length header including type identification information for identification of a type of the input packet or the stream and information of a packet length of the input packet or the stream stored in a payload of the baseband packet.

(15) A reception method including: receiving a transmitted signal including a baseband frame; generating a baseband packet from the received baseband frame; and generating an input packet or a stream from the baseband packet, wherein a header of the baseband packet includes a minimum fixed length header including type identification information for identification of a type of the input packet or the stream and information of a packet length of the input packet or the stream stored in a payload of the baseband packet.

REFERENCE SIGNS LIST 11 transmission apparatus
31 BBP generation unit
32 BBF generation unit
33 BBF scrambler
34 transmission unit
41 BBH adding unit
51 reception apparatus
71 reception unit
72 BBF descrambler
73 BBP extraction unit
73a BBH recognition part
74 input packet generation unit

The invention claimed is:

1. A reception apparatus, comprising:
processing circuitry configured to
receive a signal including a first packet having a header and a payload,
the payload of the first packet including at least one input packet from a portion of an input stream,
the header of the first packet including:
a total number of the at least one input packet included in the payload of the first packet, and
first information indicating whether second information exists in the first packet, and
the second information including a data field indicating a total number of null packets of the portion of the input stream omitted during formation of the first packet, and
restore the portion of the input stream based on the at least one input packet included in the payload of the first packet and based on the header of the first packet,
wherein the processing circuitry is configured to restore the portion of the input stream without inclusion of any null packet in addition to the at least one input packet when the first information indicates that the second information does not exist in the first packet.

2. A reception apparatus, comprising:
processing circuitry configured to
receive a signal including a first packet having a header and a payload,
the payload of the first packet including at least one input packet from a portion of an input stream,
the header of the first packet including:
a total number of the at least one input packet included in the payload of the first packet, and
first information indicating whether second information exists in the first packet, and
the second information including a data field indicating a total number of null packets of the portion of the input stream omitted during formation of the first packet, and
restore the portion of the input stream based on the at least one input packet included in the payload of the first packet and based on the header of the first packet,
wherein the processing circuitry is configured to restore the portion of the input stream by including the total number of the null packets as indicated in the second information in addition to the at least one input packet when the first information indicates that the second information exists in the first packet.

3. A reception apparatus, comprising:
processing circuitry configured to
receive a signal including a first packet having a header and a payload,
the payload of the first packet including at least one input packet from a portion of an input stream,
the header of the first packet including:
a total number of the at least one input packet included in the payload of the first packet, and
first information indicating whether second information exists in the first packet, and
the second information including a data field indicating a total number of null packets of the portion of the input stream omitted during formation of the first packet, and
restore the portion of the input stream based on the at least one input packet included in the payload of the first packet and based on the header of the first packet,
wherein the header of the first packet further includes type identification information indicating a type of the at least one input packet,
wherein the type of the at least one input packet is a transport stream packet type, wherein
the processing circuitry is configured to restore the at least one input packet into at least one restored input packet, and
at least a portion of a header of the at least one restored input packet is not included in the first packet.

4. A method, comprising:
receiving, by an apparatus, a signal including a first packet having a header and a payload,
the payload of the first packet including at least one input packet from a portion of an input stream,
the header of the first packet including:
a total number of the at least one input packet included in the payload of the first packet, and
first information indicating whether second information exists in the first packet, and
the second information including a data field indicating a total number of null packets of the portion of the input stream omitted during formation of the first packet; and
restoring, by processing circuitry of the apparatus, the portion of the input stream based on the at least one input packet included in the payload of the first packet and based on the header of the first packet,
wherein the restoring the portion of the input stream comprises:
restoring the portion of the input stream without inclusion of any null packet in addition to the at least one input packet when the first information indicates that the second information does not exist in the first packet.

5. A method, comprising:
receiving, by an apparatus, a signal including a first packet having a header and a payload,
the payload of the first packet including at least one input packet from a portion of an input stream,
the header of the first packet including:
a total number of the at least one input packet included in the payload of the first packet, and first information indicating whether second information exists in the first packet, and the second information including a data field indicating a total number of null packets of the portion of the input stream omitted during formation of the first packet; and restoring, by processing circuitry of the apparatus, the portion of the input stream based on the at least one input packet included in the payload of the first packet and based on the header of the first packet, wherein the restoring the portion of the input stream comprises:

restoring the portion of the input stream by including the total number of the null packets as indicated in the second information in addition to the at least one input packet when the first information indicates that the second information exists in the first packet.

6. A method, comprising:

receiving, by an apparatus, a signal including a first packet having a header and a payload, the payload of the first packet including at least one input packet from a portion of an input stream, the header of the first packet including:

a total number of the at least one input packet included in the payload of the first packet, and first information indicating whether second information exists in the first packet, and the second information including a data field indicating a total number of null packets of the portion of the input stream omitted during formation of the first packet; and restoring, by processing circuitry of the apparatus, the portion of the input stream based on the at least one input packet included in the payload of the first packet and based on the header of the first packet, wherein the header of the first packet further includes type identification information indicating a type of the at least one input packet, wherein the type of the at least one input packet is a transport stream packet type, wherein the restoring the portion of the input stream comprises restoring the at least one input packet into at least one restored input packet, and at least a portion of a header of the at least one restored input packet is not included in the first packet.

* * * * *